US010522299B2

(12) United States Patent
Yamauchi

(10) Patent No.: US 10,522,299 B2
(45) Date of Patent: Dec. 31, 2019

(54) NEGATIVE ELECTRODE ACTIVE MATERIAL FOR POWER STORAGE DEVICE

(71) Applicant: NIPPON ELECTRIC GLASS CO., LTD., Otsu-shi, Shiga (JP)

(72) Inventor: Hideo Yamauchi, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 48 days.

(21) Appl. No.: 15/742,047

(22) PCT Filed: Jul. 15, 2016

(86) PCT No.: PCT/JP2016/071034
§ 371 (c)(1),
(2) Date: Jan. 5, 2018

(87) PCT Pub. No.: WO2017/022460
PCT Pub. Date: Feb. 9, 2017

(65) Prior Publication Data
US 2018/0204686 A1 Jul. 19, 2018

(30) Foreign Application Priority Data

Aug. 4, 2015 (JP) .................................. 2015-153894
Nov. 24, 2015 (JP) .................................. 2015-228485

(51) Int. Cl.
| | | |
|---|---|---|
| H01G 11/06 | (2013.01) | |
| H01G 11/46 | (2013.01) | |
| H01M 10/054 | (2010.01) | |
| H01M 4/48 | (2010.01) | |
| H01G 11/50 | (2013.01) | |
| H01G 11/62 | (2013.01) | |
| H01G 11/84 | (2013.01) | |
| H01M 10/0525 | (2010.01) | |

(52) U.S. Cl.
CPC .............. *H01G 11/06* (2013.01); *H01G 11/46* (2013.01); *H01G 11/50* (2013.01); *H01G 11/62* (2013.01); *H01G 11/84* (2013.01); *H01M 4/48* (2013.01); *H01M 10/054* (2013.01); *H01M 10/0525* (2013.01)

(58) Field of Classification Search
CPC ........ H01G 11/06; H01G 11/46; H01G 11/50; H01G 11/62; H01G 11/84; H01M 10/052; H01M 10/0525; H01M 10/054; H01M 4/36; H01M 4/48

USPC .... 252/500, 519.12, 519.51, 519.52, 519.54, 252/520.21, 520.22
See application file for complete search history.

(56) References Cited

U.S. PATENT DOCUMENTS

| | | | | |
|---|---|---|---|---|
| 6,132,903 | A | 10/2000 | Fujimoto et al. | |
| 8,852,816 | B2 * | 10/2014 | Ogasa | H01M 10/0562 |
| | | | | 429/188 |
| 9,350,013 | B2 * | 5/2016 | Teraoka | C04B 38/0038 |
| 9,673,483 | B2 * | 6/2017 | Badding | H01M 10/0562 |
| 2012/0077095 | A1 * | 3/2012 | Roumi | H01G 11/02 |
| | | | | 429/405 |
| 2013/0011726 | A1 * | 1/2013 | Takano | C01G 45/1228 |
| | | | | 429/188 |
| 2016/0164082 | A1 | 6/2016 | Yamauchi | |
| 2016/0226100 | A1 * | 8/2016 | Yamada | H01M 4/587 |
| 2016/0359191 | A1 * | 12/2016 | Teraoka | H01M 10/0562 |
| 2017/0149039 | A1 * | 5/2017 | Shon | H01M 2/1653 |
| 2017/0179464 | A1 * | 6/2017 | Ein-Eli | B23K 35/36 |
| 2017/0229731 | A1 * | 8/2017 | Visco | H01M 10/0562 |
| 2017/0309918 | A1 * | 10/2017 | Roumi | H01M 4/366 |
| 2018/0131040 | A1 * | 5/2018 | Visco | H01M 10/0562 |
| 2018/0166683 | A1 * | 6/2018 | Yamauchi | H01G 11/06 |
| 2018/0219221 | A1 * | 8/2018 | Yamauchi | H01G 11/06 |
| 2019/0123389 | A1 * | 4/2019 | Nakagaki | H01M 10/052 |
| 2019/0131658 | A1 * | 5/2019 | Sasaki | H01G 11/60 |

FOREIGN PATENT DOCUMENTS

| | | |
|---|---|---|
| JP | 11-40150 A | 2/1999 |
| JP | 2012-54208 A | 3/2012 |
| JP | 2015-35290 A | 2/2015 |
| JP | 2015-198000 A | 11/2015 |
| WO | WO-2015045387 A1 * 4/2015 ............ H01M 4/587 |

OTHER PUBLICATIONS

Official Communication issued in International Patent Application No. PCT/JP2016/071034, dated Oct. 11, 2016.
The Electrochemical Society, "Abstract #137", 223rd ESC Meeting, 2013, 1 page.

* cited by examiner

*Primary Examiner* — Douglas J McGinty
(74) *Attorney, Agent, or Firm* — Keating and Bennett, LLP

(57) ABSTRACT

Provided is a negative-electrode active material for a power storage device that has a low operating potential, can increase the operating voltage of the power storage device, and has excellent cycle characteristics. The negative-electrode active material for a power storage device, the negative-electrode active material containing, in terms of % by mole of oxide, 1 to 95% $TiO_2$ and 5 to 75% $P_2O_5+SiO_2+B_2O_3+Al_2O_3+R'O$ (where R' represents at least one selected from Mg, Ca, Sr, Ba, and Zn) and containing 10% by mass or more amorphous phase.

6 Claims, 6 Drawing Sheets

[FIG. 1]
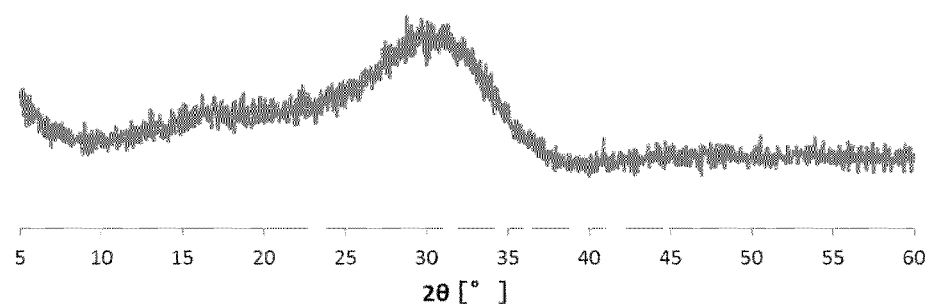
[FIG. 2]
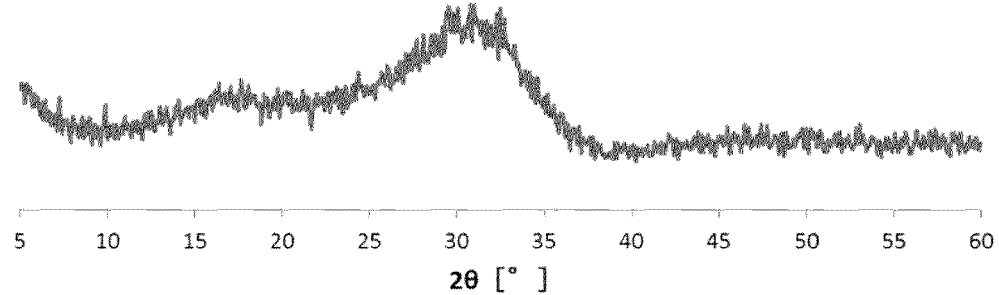
[FIG. 3]
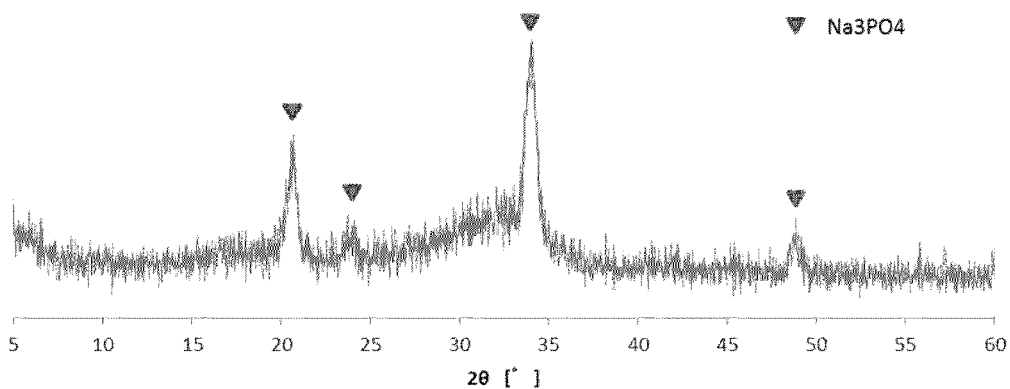

[FIG. 4]
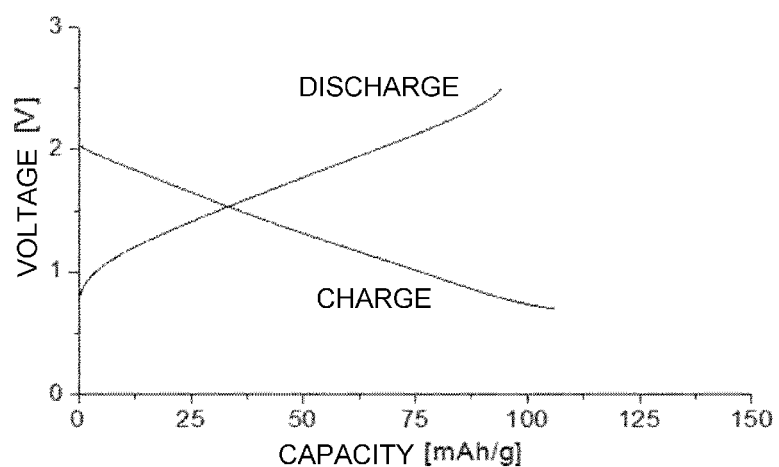
[FIG. 5]
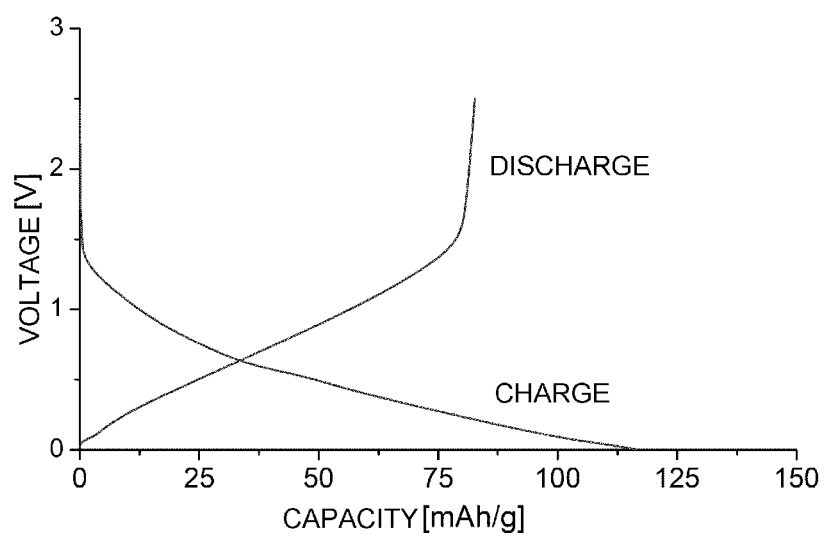

[FIG. 6]
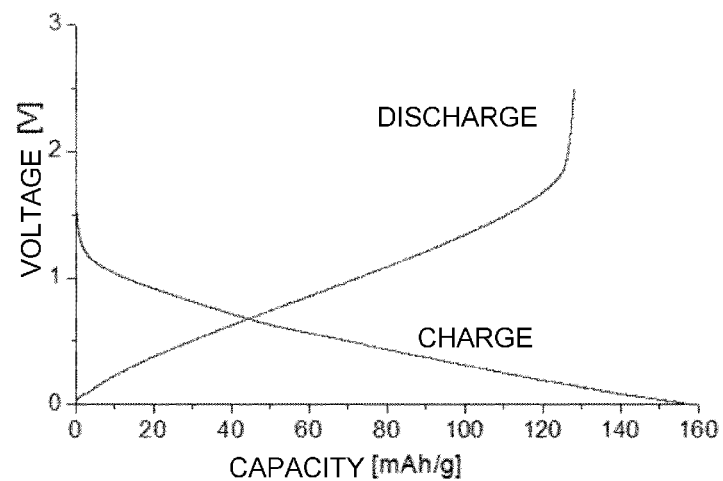
[FIG. 7]
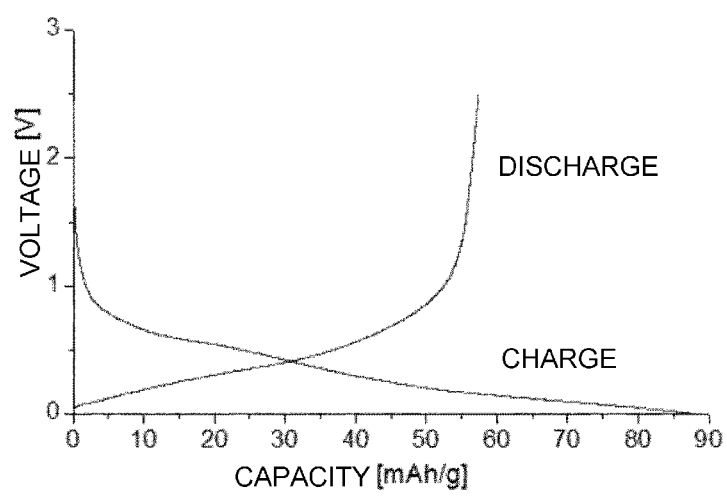

[FIG. 8]
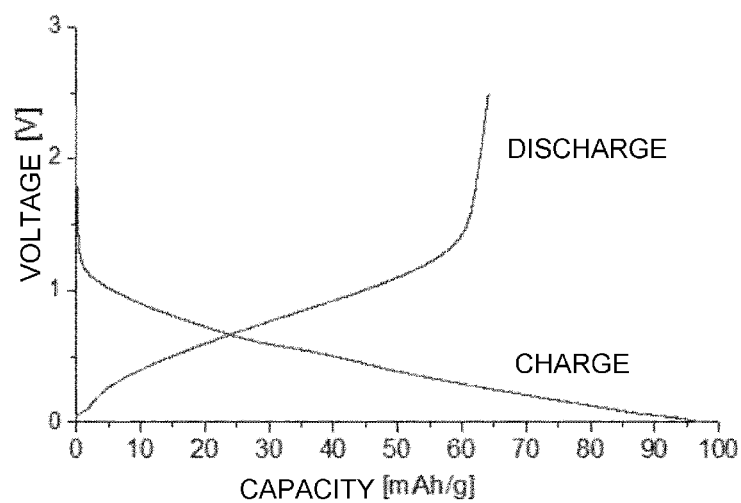
[FIG. 9]
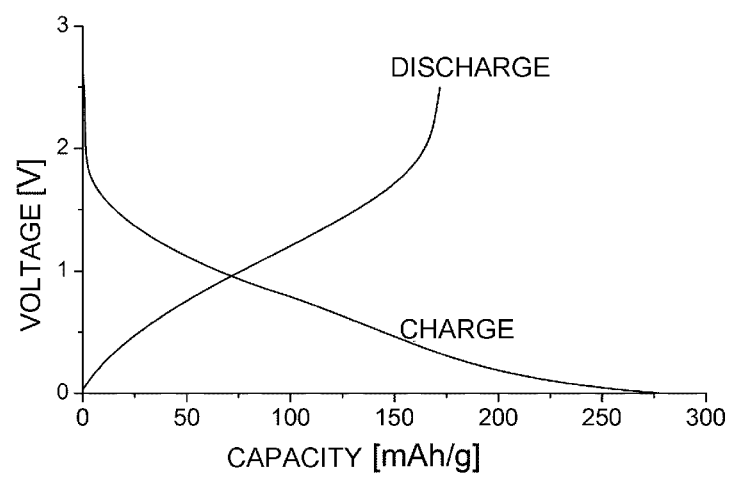

[FIG. 10]
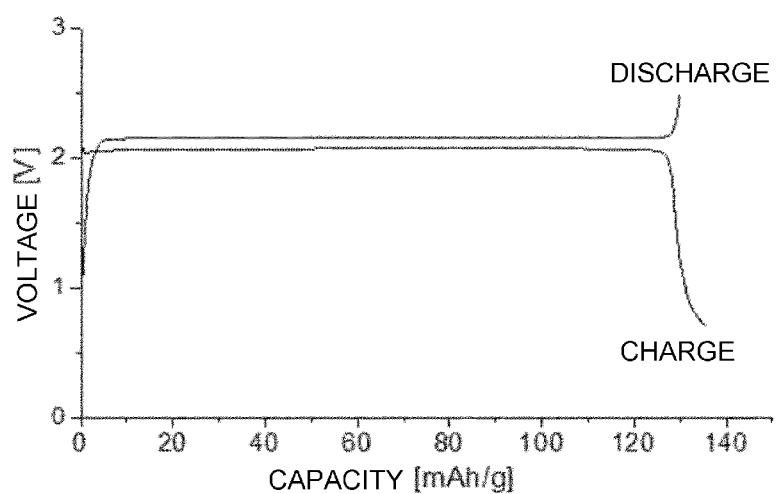
[FIG. 11]
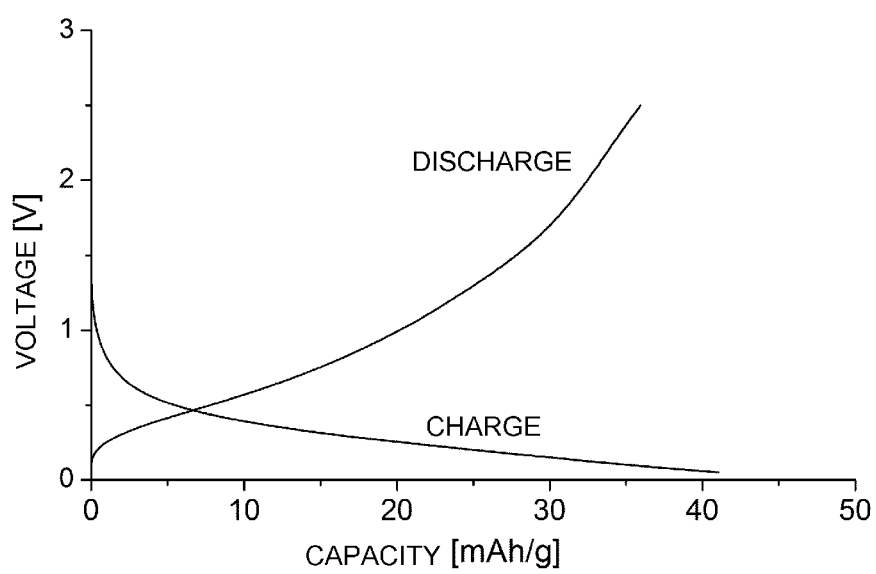

[FIG. 12]
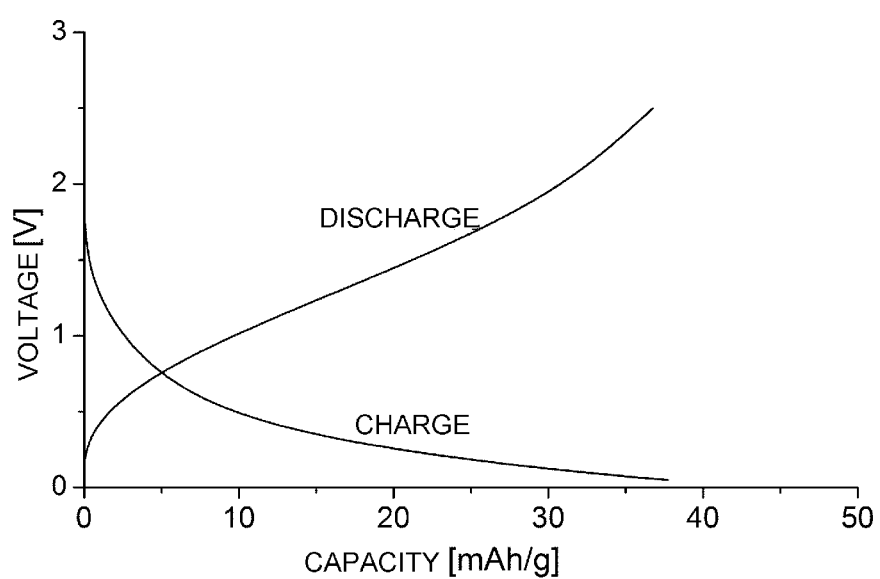

NEGATIVE ELECTRODE ACTIVE MATERIAL FOR POWER STORAGE DEVICE

TECHNICAL FIELD

The present invention relates to negative-electrode active materials for use in power storage devices, such as a lithium-ion secondary battery, a sodium-ion secondary battery, and a hybrid capacitor, for use in portable electronic devices, electric vehicles, electric power tools, backup emergency power supplies, and so on.

BACKGROUND ART

Recently, with the widespread use of portable electronic devices, electric vehicles, and so on, developments of power storage devices, including lithium-ion secondary batteries and sodium-ion secondary batteries, have been promoted. Materials containing Si or Sn having a high theoretical capacity are being studied as negative-electrode active materials for use in power storage devices. However, with the use of a negative-electrode active material containing Si or Sn, the negative-electrode active material exhibits a large volume change due to expansion and contraction thereof occurring during insertion/extraction reaction of lithium ions or sodium ions, which presents a problem that there arises a significant collapse of the negative-electrode active material due to repeated charges and discharges and, therefore, the cycle characteristics are likely to decrease.

To cope with this, $NaTi_2(PO_4)_3$ and $Na_3Ti_2(PO_4)_3$, which are NASICON-type compounds, are proposed as negative-electrode active materials having relatively good cycle characteristics (see, for example, Patent Literature 1 and Non-Patent Literature 1).

CITATION LIST

Patent Literature

Patent Literature 1: JP-A 2012-54208

Non-Patent Literature

Non-Patent Literature 1: Abstract #137, 223rd ECS Meeting, 2013 The Electrochemical Society

SUMMARY OF INVENTION

Technical Problem

The operating voltage of a power storage device is determined by the difference between the operating voltage of the positive electrode and the operating voltage of the negative electrode and becomes larger as the operating voltage of the negative electrode decreases. When $NaTi_2(PO_4)_3$ or $Na_3Ti_2(PO_4)_3$ is used as the negative-electrode active material for the power storage device, the $Ti^{4+}/Ti^{3+}$ reaction potential is very high, 2.2V (vs. $Na/Na^+$), so that the operating voltage of the negative electrode becomes high, which presents a problem that the operating voltage of the power storage device in which this negative-electrode active material is used becomes small.

In view of the above circumstances, the present invention has an object of providing a negative-electrode active material for a power storage device that has a low operating potential, can increase the operating voltage of the power storage device, and has excellent cycle characteristics.

Solution to Problem

A negative-electrode active material for a power storage device according to the present invention contains, in terms of % by mole of oxide, 1 to 95% $TiO_2$ and 5 to 75% $P_2O_5+SiO_2+B_2O_3+Al_2O_3+R'O$ (where R' represents at least one selected from Mg, Ca, Sr, Ba, and Zn) and contains 10% by mass or more amorphous phase. Note that "(component)+(component)+ . . . " herein means the total of the contents of the relevant components.

Since the negative-electrode active material for a power storage device according to the present invention contains 10% by mass or more amorphous phase, it has excellent diffusivity of alkali ions, such as lithium ions or sodium ions and, therefore, facilitates insertion and extraction of alkali ions due to charge and discharge. As a result, the redox potential decreases and the operating voltage of the negative electrode can be decreased. In addition, since the content of the amorphous phase is as large as 10% by mass or more, the degree of freedom of composition is high, so that the increase in capacity and the decrease in voltage can be easily achieved.

Furthermore, in the negative-electrode active material according to the present invention, a structure is formed in which Ti ions as an active material component are uniformly dispersed in an oxide matrix made of $P_2O_5$, $SiO_2$, $B_2O_3$, $Al_2O_3$ or R'O. Therefore, the volume change of Ti ions due to insertion and extraction of alkali ions can be restrained and the negative-electrode active material has excellent cycle characteristics.

Moreover, when the negative-electrode active material for a power storage device according to the present invention is used in an all-solid-state secondary battery, the amorphous phase is likely to exist at the interface between the negative-electrode active material and the solid electrolyte. The amorphous phase serves as a conducting path for alkali ions and therefore decreases the interfacial resistance between the active material crystal and the solid electrolyte, so that the discharge capacity and discharge voltage of the power storage device are likely to increase. In addition, because the amorphous phase also acts as a binder, the adhesive strength between the negative electrode layer and the solid electrolyte layer is increased.

If the proportion of the amorphous phase is low, undesirable crystals may be precipitated depending on the composition. Such crystals cause an increase in the operating voltage of the negative-electrode active material, a decrease in rapid charge/discharge characteristics, and a decrease in cycle characteristics. Since the negative-electrode active material for a power storage device according to the present invention has a proportion of amorphous phase as high as 10% by mass or more, the precipitation of undesirable crystals can be inhibited.

The negative-electrode active material for a power storage device according to the present invention preferably further contains 1 to 70% $R_2O$ (where R represents at least one selected from Li, Na, and K).

The negative-electrode active material for a power storage device according to the present invention inserts and extracts alkali ions with charge and discharge, but some alkali ions may remain inserted in the negative-electrode active material without being extracted. The remaining alkali ions lead to an irreversible capacity and cause a decrease in first discharge capacity. To cope with this, an $R_2O$ is previously contained in the negative-electrode active material, which makes it difficult for alkali ions to be absorbed into the negative-electrode active material during the first charge and thus enables the first discharge capacity to increase. Furthermore, since the negative-electrode active material contains $R_2O$, the alkali-ion conductivity increases and the operating voltage of the negative electrode is likely to decrease for the previously described reason.

The negative-electrode active material for a power storage device according to the present invention is preferably made of an amorphous phase. In this relation, the term "made of an amorphous phase" refers to the negative-electrode active material for which a diffraction line profile at 2θ values of 10 to 60° obtained by powder X-ray diffraction measurement (XRD) using CuKα rays includes a broad diffraction curve (amorphous halo) at 10 to 40° and no crystalline diffraction peak is found in the diffraction line profile. More specifically, the above term refers to the negative-electrode active material in which the proportion of the amorphous phase is approximately 100%.

The negative-electrode active material for a power storage device according to the present invention is suitable for use in a sodium-ion secondary battery.

A negative electrode material for a power storage device according to the present invention contains the above-described negative-electrode active material for a power storage device.

Advantageous Effects of Invention

The present invention enables provision of a negative-electrode active material for a power storage device that has a low operating potential, can increase the operating voltage of the power storage device, and has excellent cycle characteristics.

BRIEF DESCRIPTION OF DRAWINGS

FIG. 1 is a chart showing an XRD pattern of sample No. 6 which is a working example.

FIG. 2 is a chart showing an XRD pattern of No. 68 which is a working example.

FIG. 3 is a chart showing an XRD pattern of No. 69 which is a working example.

FIG. 4 is a graph showing first charge/discharge curves of a test cell for a sodium-ion secondary battery in which sample No. 6 as a working example is used.

FIG. 5 is a graph showing first charge/discharge curves of a test cell for a sodium-ion secondary battery in which sample No. 69 as a working example is used.

FIG. 6 is a graph showing first charge/discharge curves of a test cell for a sodium-ion secondary battery in which sample No. 70 as a working example is used.

FIG. 7 is a graph showing first charge/discharge curves of a test cell for a sodium-ion secondary battery in which sample No. 71 as a working example is used.

FIG. 8 is a graph showing first charge/discharge curves of a test cell for a sodium-ion secondary battery in which sample No. 72 as a working example is used.

FIG. 9 is a graph showing first charge/discharge curves of a test cell for a lithium-ion secondary battery in which sample No. 78 as a working example is used.

FIG. 10 is a graph showing first charge/discharge curves of a test cell for a sodium-ion secondary battery in which sample No. 87 as a comparative example is used.

FIG. 11 is a graph showing first charge/discharge curves of a test cell for a solid-state sodium-ion secondary battery in which sample No. 92 as a working example is used.

FIG. 12 is a graph showing first charge/discharge curves of a test cell for a solid-state sodium-ion secondary battery in which sample No. 93 as a working example is used.

DESCRIPTION OF EMBODIMENTS

A negative-electrode active material for a power storage device according to the present invention contains, in terms of % by mole of oxide, 1 to 95% $TiO_2$ and 5 to 75% $P_2O_5+SiO_2+B_2O_3+Al_2O_3+R'O$ (where R' represents at least one selected from Mg, Ca, Sr, Ba, and Zn). Reasons why each of the contents of the components is limited as just described will be described below. Note that in the description of the content of each component "%" refers to "% by mole" unless otherwise stated.

$TiO_2$ is an active material component serving as sites where alkali ions are inserted and extracted. The content of $TiO_2$ is preferably 1 to 95%, more preferably 5 to 72%, still more preferably 10 to 68%, yet still more preferably 12 to 58%, yet still more preferably 15 to 49%, and particularly preferably 15 to 39%. If the content of $TiO_2$ is too small, the discharge capacity per unit mass of the negative-electrode active material tends to be small and the charge/discharge efficiency during the first charge and discharge tends to decrease. On the other hand, if the content of $TiO_2$ is too large, the volume change of Ti ions due to insertion and extraction of alkali ions during charge and discharge become unable to be reduced, so that the cycle characteristics tend to decrease.

$P_2O_5$, $SiO_2$, $B_2O_3$, $Al_2O_3$, and R'O have excellent alkali-ion conductivity and the effect of decreasing the operating voltage of the negative electrode. Furthermore, they have the effect of restraining the volume change of Ti ions during insertion and extraction of alkali ions to increase the cycle characteristics. Preferred among them are $SiO_2$, $B_2O_3$, and $Al_2O_3$ because they are excellent in the effect of decreasing the operating voltage. The content of $P_2O_5+SiO_2+B_2O_3+Al_2O_3+R'O$ is preferably 5 to 75%, more preferably 7 to 60%, still more preferably 10 to 50%, yet still more preferably 12 to 40%, and particularly preferably 20 to 35%. If the content of $P_2O_5+SiO_2+B_2O_3+Al_2O_3+R'O$ is too small, the above effects are less likely to be achieved. On the other hand, if the content of $P_2O_5+SiO_2+B_2O_3+Al_2O_3+R'O$ is too large, the content of $TiO_2$ becomes relatively small, so that the discharge capacity is likely to decrease.

Respective preferred ranges of contents of the components $P_2O_5$, $SiO_2$, $B_2O_3$, $Al_2O_3$, and R'O are as follows.

The content of $P_2O_5$ is preferably 5 to 75%, more preferably 7 to 60%, still more preferably 10 to 50%, yet still more preferably 12 to 40%, and particularly preferably 20 to 35%. If the content of $P_2O_5$ is too small, the above effects are less likely to be achieved. On the other hand, if the content of $P_2O_5$ is too large, the discharge capacity is likely to decrease and the water resistance is likely to decrease. Furthermore, when an aqueous electrode paste is prepared, undesirable other crystals are produced to break the $P_2O_5$ network, so that the cycle characteristics are likely to decrease.

The content of $SiO_2$ is preferably 0 to 75%, more preferably 5 to 75%, still more preferably 7 to 60%, yet still more preferably 10 to 50%, yet still more preferably 12 to 40%, and particularly preferably 20 to 35%. If the content of $SiO_2$ is too large, the discharge capacity is likely to decrease.

The content of $B_2O_3$ is preferably 0 to 75%, more preferably 5 to 75%, still more preferably 7 to 60%, yet still more preferably 10 to 50%, yet still more preferably 12 to 40%, and particularly preferably 20 to 35%. If the content of $B_2O_3$ is too large, the discharge capacity is likely to decrease and the chemical durability is likely to decrease.

The content of $Al_2O_3$ is preferably 0 to 75%, more preferably 5 to 70%, still more preferably 7 to 60%, yet still more preferably 10 to 50%, yet still more preferably 12 to 40%, and particularly preferably 15 to 35%. If the content of $Al_2O_3$ is too large, the discharge capacity is likely to decrease.

The content of R'O is preferably 0 to 75%, more preferably 5 to 70%, still more preferably 7 to 60%, yet still more preferably 10 to 50%, yet still more preferably 12 to 40%, and particularly preferably 15 to 35%. If the content of R'O is too large, the discharge capacity is likely to decrease. Note that the content of each component of MgO, CaO, SrO, BaO, and ZnO is preferably 0 to 75%, more preferably 5 to 70%, still more preferably 7 to 60%, yet still more preferably 10 to 50%, yet still more preferably 12 to 40%, and particularly preferably 15 to 35%.

Furthermore, in addition to the above components, the negative-electrode active material preferably contains $R_2O$ (where R represents at least one selected from Li, Na, and K). $R_2O$ is a component that makes it difficult for alkali ions to be absorbed into the negative-electrode active material during the first charge and thus increases the first discharge capacity. Moreover, $R_2O$ also has the effect of increasing alkali-ion conductivity to decrease the operating voltage of the negative electrode. The content of $R_2O$ is preferably 1 to 70%, more preferably 5 to 60%, still more preferably 7 to 55%, yet still more preferably 10 to 53%, and particularly preferably 15 to 49%. If the content of $R_2O$ is too small, the above effects are less likely to be achieved. On the other hand, if the content of $R_2O$ is too large, other crystals containing an alkali ion (such as $Li_3PO_4$, $Na_4P_2O_7$, and $NaPO_4$) are formed in large amounts, so that the cycle characteristics are likely to decrease. In addition, the content of active material component becomes relatively small, so that the discharge capacity tends to decrease.

Among $R_2O$ oxides, the use of $Li_2O$ or $Na_2O$ having a small atomic weight is preferred because it can increase the content of active material component and $Na_2O$ present as a plentiful resource is particularly preferred. When during charge and discharge in the power storage device, ions inserted from or extracted to the positive electrode through the electrolyte are lithium ions, the negative-electrode active material preferably contains $Li_2O$. When these ions are sodium ions, the negative-electrode active material preferably contains $Na_2O$. When these ions are potassium ions, the negative-electrode active material preferably contains $K_2O$.

In the negative-electrode active material for a power storage device according to the present invention, the molar ratio between the content of $TiO_2$ and the content of $P_2O_5+SiO_2+B_2O_3+Al_2O_3+R'O$ ($TiO_2/(P_2O_5+SiO_2+B_2O_3+Al_2O_3+R'O)$) is preferably 0.2 to 4, more preferably 0.3 to 3, still more preferably 0.4 to 2.5, and particularly preferably 0.5 to 2. If $TiO_2/(P_2O_5+SiO_2+B_2O_3+Al_2O_3+R'O)$ is too small, the amount of active material component becomes small, so that the discharge capacity is likely to decrease. Furthermore, alkali ions inserted during the first charge are likely to be absorbed in an oxide matrix made of $P_2O_5$, $SiO_2$, $B_2O_3$, $Al_2O_3$ or R'O, so that the first charge/discharge efficiency tends to decrease. On the other hand, if $TiO_2/(P_2O_5+SiO_2+B_2O_3+Al_2O_3+R'O)$ is too large, the oxide matrix made of $P_2O_5$, $SiO_2$, $B_2O_3$, $Al_2O_3$ or R'O becomes unable to reduce the volume change of Ti ions, so that the cycle characteristics tend to decrease.

In the negative-electrode active material for a power storage device according to the present invention, the molar ratio between the content of $R_2O$ and the content of $(P_2O_5+SiO_2+B_2O_3+Al_2O_3+R'O)$ ($R_2O/(P_2O_5+SiO_2+B_2O_3+Al_2O_3+R'O)$) is preferably 0.03 to 2.5, more preferably 0.1 to 2.3, still more preferably 0.3 to 2.2, and particularly preferably 0.5 to 2.1. If $R_2O/(P_2O_5+SiO_2+B_2O_3+Al_2O_3+R'O)$ is too small, the content of alkali ions contained in the oxide matrix made of $P_2O_5$, $SiO_2$, $B_2O_3$, $Al_2O_3$ or R'O decreases, so that the ion conductivity is likely to decrease. As a result, the redox potential during charge and discharge increases, so that the operating voltage of the power storage device is likely to decrease. Furthermore, alkali ions inserted during the first charge are likely to be absorbed in the oxide matrix made of $P_2O_5$, $SiO_2$, $B_2O_3$, $Al_2O_3$ or R'O, so that the first charge/discharge efficiency tends to decrease. On the other hand, if $R_2O/(P_2O_5+SiO_2+B_2O_3+Al_2O_3+R'O)$ is too large, the oxide matrix made of $P_2O_5$, $SiO_2$, $B_2O_3$, $Al_2O_3$ or R'O becomes unable to sufficiently reduce the volume change of Ti ions, so that the cycle characteristics tend to decrease.

In addition to the above components, various components can be contained in the negative-electrode active material without impairing the effects of the present invention. Specifically, in terms of oxides, CuO, SnO, $Bi_2O_3$, $GeO_2$, $ZrO_2$, $V_2O_5$, $Nb_2O_5$, $Fe_2O_3$ or $Sb_2O_5$ can be contained in the negative-electrode active material. Particularly, $V_2O_5$, $Nb_2O_5$, and $Fe_2O_3$ are preferred because they serve as active material components. The content of the above components is, in total, preferably 0 to 40%, more preferably 0.1 to 30%, and particularly preferably 0.5 to 20%.

The negative-electrode active material according to the present invention contains an amorphous phase in an amount of 10% by mass or more, preferably 30% by mass or more, more preferably 50% by mass or more, still more preferably 80% by mass or more, yet still more preferably 90% by mass or more, yet still more preferably 95% by mass or more, yet still more preferably 99% by mass or more, particularly preferably 99.9% by mass or more, and most preferably the negative-electrode active material is made of an amorphous phase. If the content of amorphous phase is too small, the alkali-ion conductivity is likely to decrease.

The content of amorphous phase can be determined by using a diffraction line profile at 2θ values of 10 to 60° obtained by powder X-ray diffraction measurement using CuKα rays and making a peak separation of the profile into crystalline diffraction lines and an amorphous halo. Specifically, the background is subtracted from the diffraction line profile to obtain a total scattering curve, a broad diffraction curve (amorphous halo) at 10 to 45° is peak-separated from the total scattering curve and integrated, the obtained integrated intensity of the halo is represented as Ia, crystalline diffraction lines of each of crystalline phases detected at 10 to 60° are peak-separated from the total scattering curve and integrated, and the sum of the obtained integrated intensities of the crystalline diffraction lines is represented as Ic. In this case, the content Xc of crystals and the content Xa of amorphous phase can be determined from the following equations.

$$Xc=[Ic/(Ic+Ia)]\times100(\%)$$

$$Xa=100-Xc(\%)$$

The negative-electrode active material for a power storage device according to the present invention can be manufactured by formulating raw material powders to give a desired composition and using the obtained raw material powders to subject them to a melting and rapid cooling process, a sol-gel process, a chemical vapor synthesis process, such as spraying of a mist of raw material powder solution into flame, a mechanochemical process or other processes. In the case of a composition that is difficult to vitrify (for example, a composition having a large content of $TiO_2$), an usual melting and rapid cooling process may not be able to form a desired amorphous body and thus may not be able to provide a homogeneous negative-electrode active material. To cope with this, it is preferred that a melt-solidified body obtained by the usual melting and rapid cooling process be first made into powder form and then be sprayed into flame to be melted again and rapidly cooled. In this manner, even a composition that is difficult to vitrify as described above can be easily made amorphous.

The negative-electrode active material obtained by the above methods is, as necessary, ground or classified in order to obtain powder having a desired size. For grinding, a mortar, a ball mill, a vibrating ball mill, a satellite ball mill, a planetary ball mill, a jet mill or other means can be used. For classification, sieving, centrifugation, air classification or other methods can be used.

When the negative-electrode active material is in powder form, its average particle size is preferably 0.1 to 20 μm, more preferably 0.2 to 15 μm, still more preferably 0.3 to 10 μm, and particularly preferably 0.5 to 5 μm. Furthermore, its maximum particle size is preferably 150 μm or less, more preferably 100 μm or less, still more preferably 75 μm or less, and particularly preferably 55 μm or less. If the average particle size or maximum particle size of the negative-electrode active material is too large, this results in an inability to reduce the volume change of the negative-electrode active material due to insertion and extraction of alkali ions during charge and discharge, so that the negative-electrode active material is likely to peel off the current collector and the cycle characteristics tend to significantly decrease. On the other hand, if the average particle size is too small, the dispersed state of powder in the negative-electrode active material when produced in paste form is likely to be poor. As a result, it becomes necessary to increase the amounts of binder and solvent added or the applicability becomes poor, so that a uniform electrode formation tends to become difficult.

Herein, the average particle size and the maximum particle size refer to a median primary particle diameter D50 (diameter at 50% cumulative volume) and a median primary particle diameter D90 (diameter at 90% cumulative volume), respectively, and are values measured by a laser diffraction particle size distribution measurement device.

Furthermore, the specific surface area of the negative-electrode active material in powder state measured by the BET method is preferably 0.1 to 20 $m^2/g$, more preferably 0.15 to 15 $m^2/g$, and particularly preferably 0.2 to 10 $m^2/g$. If the specific surface area of the negative-electrode active material is too small, alkali ions cannot be rapidly inserted and extracted, so that the charge/discharge time tends to be long. On the other hand, if the specific surface area of the negative-electrode active material is too large, the dispersed state of powder in the negative-electrode active material when produced in paste form is likely to be poor. As a result, it becomes necessary to increase the amounts of binder and solvent added or the applicability becomes poor, so that a uniform electrode formation tends to become difficult.

The negative-electrode active material for a power storage device according to the present invention is preferably coated or mixed with electrically conductive carbon to be given electrical conductivity. By coating the surface of the negative-electrode active material with electrically conductive carbon, the electronic conductivity becomes high, so that the rapid charge/discharge characteristics are likely to increase. Examples of the electrically conductive carbon that can be used include highly electrically conductive carbon blacks, such as acetylene black and Ketjenblack, carbon powders, such as graphite, and carbon fibers. Preferred among them is acetylene black because of its high electronic conductivity.

An example of a method for mixing the negative-electrode active material and the electrically conductive carbon while grinding them is a method in which a general grinder is used, such as a mortar, a mortar mixer, a ball mill, an attritor, a vibrating ball mill, a satellite ball mill, a planetary ball mill, a jet mill or a bead mill. Preferred among them is the use of a planetary ball mill. The planetary ball mill has a structure in which a disk rotates on its axis while pots thereon rotate on their own axises, so that very high impact energy can be efficiently produced to enable homogeneous dispersion of the electrically conductive carbon into the negative-electrode active material.

Furthermore, another example of the method for imparting the negative-electrode active material electrical conductivity is a method of mixing a negative-electrode active material in powder state and an organic compound and then firing the mixture in an inert atmosphere or a reductive atmosphere to carbonize the organic compound, thus coating the surface of the negative-electrode active material with the electrically conductive carbon. In this relation, if the firing temperature is too high, crystallization progresses to make the proportion of amorphous phase more likely to decrease. Therefore, the firing temperature is preferably the crystallization temperature of the negative-electrode active material or below and particularly preferably (the crystallization temperature minus 30° C.) or below. Any organic compound may be used as far as it can stay as carbon after being subjected to heat treatment and examples include glucose, citric acid, ascorbic acid, phenolic resin, and a surfactant. Particularly preferred is a surfactant because of its ease of adsorption on the surface of the negative-electrode active material. The surfactant may be any of a cationic surfactant, an anionic surfactant, an amphoteric surfactant, and a non-ionic surfactant, but particularly preferred is a non-ionic surfactant because of its excellent adsorbability on the surface of the negative-electrode active material.

The content of the electrically conductive carbon is, per 100 parts by mass of negative-electrode active material, preferably 0.01 to 20 parts by mass, more preferably 0.03 to 15 parts by mass, still more preferably 0.05 to 12 parts by mass, and particularly preferably 0.07 to 10 parts by mass. If the content of electrically conductive carbon is too small, the negative-electrode active material is insufficiently coated and tends to be less electronically conductive. On the other hand, if the carbon content is too large, the proportion of negative-electrode active material in the negative electrode material becomes small, so that the discharge capacity is likely to decrease.

The thickness of the electrically conductive carbon coating formed on the surface of the negative-electrode active material is preferably 1 to 100 nm and particularly preferably 5 to 80 nm. If the thickness of the electrically conductive carbon coating is too small, the coating may be lost in the charging/discharging process to deteriorate the battery characteristics. On the other hand, if the thickness of the electrically conductive carbon coating is too large, the discharge capacity and operating voltage of the power storage device are likely to decrease.

In the negative-electrode active material on the surface of which an electrically conductive carbon coating is formed, the ratio (D/G) of a peak intensity D between 1300 and 1400 cm$^{-1}$ to a peak intensity G between 1550 and 1650 cm$^{-1}$, both measured by Raman spectroscopy, is preferably 1 or less and particularly preferably 0.8 or less, and the ratio (F/G) of a peak intensity F between 800 to 1100 cm$^{-1}$ to the peak intensity G is preferably 0.5 or less and particularly preferably 0.1 or less. Here, the peak intensity G originates from crystalline carbon and the peak intensity D originates from amorphous carbon. Therefore, as the peak intensity ratio D/G is smaller, this means that the electrically conductive carbon coating is more crystalline, and the electronic conductivity tends to be higher. Furthermore, the peak intensity F originates from the components of the negative-electrode active material. Therefore, as the peak intensity ratio F/G is smaller, this means that a higher proportion of the surface of the negative-electrode active material is covered with crystalline, electrically conductive carbon coating, and the electronic conductivity tends to be higher.

The negative-electrode active material for a power storage device according to the present invention has a tapped density of preferably 0.3 g/ml or more and particularly preferably 0.5 g/ml or more. If the tapped density of the negative-electrode active material is too small, the electrode density becomes small, so that the discharge capacity per unit volume of the electrode tends to decrease. The upper limit of the tapped density is a value approximately corresponding to the true specific gravity of the negative-electrode active material, but is, in consideration of powder aggregation, actually 5 g/ml or less and particularly 4 g/ml or less. Note that in the present invention the tapped density refers to a value measured under conditions of a tapping stroke of 10 mm, a number of taps of 250, and a tapping rate of two taps per second.

The negative-electrode active material for a power storage device according to the present invention can be used as a negative electrode material for a power storage device by adding a binder and a conductive aid to make the negative-electrode active material into paste form.

The binder is a component to be added to the negative-electrode active material in order to bind the negative-electrode active material particles together or bind the negative-electrode active material and the solid electrolyte to prevent the negative-electrode active material from peeling off the negative electrode due to a volume change during charge and discharge. Examples of the binder include thermoplastic straight-chain polymers, such as polytetrafluoroethylene (PTFE), poly(vinylidene fluoride) (PVDF), fluorine-containing rubbers, and styrene-butadiene rubber (SBR); thermosetting resins, such as thermosetting polyimide, polyamide-imide, polyamide, phenolic resin, epoxy resin, urea resin, melamine resin, unsaturated polyester resin, and polyurethane; cellulose derivatives, such as carboxymethyl cellulose (including salts of carboxymethyl cellulose, such as sodium carboxymethyl cellulose, the same applies hereafter), hydroxypropylmethyl cellulose, hydroxypropyl cellulose, hydroxyethyl cellulose, ethyl cellulose, and hydroxymethyl cellulose; and water-soluble polymers, such as polyvinyl alcohol, polyacrylamide, polyvinyl pyrrolidone, and their copolymers. Among them, thermosetting resins, cellulose derivatives, and water-soluble polymers are preferred because of their excellent binding properties and thermosetting polyimide or carboxymethyl cellulose is more preferred because of their industrially widespread use. Particularly, carboxymethyl cellulose is most preferred because it is inexpensive and does not need any organic solvent for preparation of a paste having a low environmental burden. These binders may be used singly or in a mixture of two or more of them.

Examples of the conductive aid include highly electrically conductive carbon blacks, such as acetylene black and Ketjenblack, carbon powders, such as graphite, and carbon fibers.

Furthermore, the negative-electrode active material for a power storage device according to the present invention can also be used as a composite material as an electrode by mixing with a below-described alkali-ion conductive solid electrolyte.

The above negative electrode material for a power storage device can be used as a negative electrode for a power storage device by applying the negative electrode material for a power storage device to the surface of a metal foil or the like serving as a current collector or by using the negative electrode material for a power storage device to form a negative electrode layer and then forming a metal thin film or the like on the surface of the negative electrode layer.

The negative electrode for a power storage device can be used as a power storage device by combining with a separately prepared positive electrode for a power storage device and an electrolyte. An aqueous electrolyte, a nonaqueous electrolyte or a solid electrolyte can be used as the electrolyte.

The aqueous electrolyte is made by dissolving an electrolyte salt in water. When alkali ions to be supplied from the positive electrode are lithium ions, examples of the electrolyte salt include $LiNO_3$, LiOH, LiF, LiCl, LiBr, LiI, $LiClO_4$, $Li_2SO_4$, $CH_3COOLi$, $LiBF_4$, and $LiPF_6$. When the alkali ions are sodium ions, examples of the electrolyte salt include $NaNO_3$, $Na_2SO_4$, NaOH, NaCl, and $CH_3COONa$. When the alkali ions are potassium ions, examples of the electrolyte salt include $KNO_3$, KOH, KF, KCl, KBr, KI, $KClO_4$, $K_2SO_4$, $CH_3COOK$, $KBF_4$, and $KPF_6$. These electrolyte salts may be used singly or in a mixture of two or more of them. The electrolyte salt concentration is appropriately adjusted, generally, within a range of not less than 0.1 M and not more than the saturation concentration.

The nonaqueous electrolyte contains: an organic solvent and/or an ionic liquid both of which are nonaqueous solvents; and an electrolyte salt dissolved in the nonaqueous solvent. Specific examples of the organic solvent, the ionic liquid, and the electrolyte salt are as follows. Note that the characters in [ ] after the below-mentioned compound names indicate abbreviations.

Examples of the organic solvent include propylene carbonate [PC], ethylene carbonate [EC], 1,2-dimethoxyethane [DME], γ-butyrolactone [GBL], tetrahydrofuran [THF], 2-methyltetrahydrofuran [2-MeHF], 1,3-dioxolan, sulfolane, acetonitrile [AN], diethyl carbonate [DEC], dimethyl carbonate [DMC], methylethyl carbonate [MEC], and dipropyl carbonate [DPC]. These organic solvents may be used singly or in a mixture of two or more of them. Preferred among them is propylene carbonate because of its excellent low-temperature characteristics.

Examples of the ionic liquid include: aliphatic quaternary ammonium salts, such as N,N,N-trimethyl-N-propyl ammonium bis(trifluoromethanesulfonyl)imide [TMPA-TFSI], N-methyl-N-propylpiperidinium bis(trifluoromethanesulfonyl)imide [PP13-TFSI], N-methyl-N-propylpyrrolidinium bis(trifluoromethanesulfonyl)imide [P13-TFSI], and N-methyl-N-butylpyrrolidinium bis(trifluoromethanesulfonyl)imide [P14-TFSI]; and quaternary alkylimidazolium salts, such as 1-methyl-3-ethylimidazolium tetrafluoroborate [EMIBF4], 1-methyl-3-ethylimidazolium bis(trifluoromethanesulfonyl)imide [EMITFSI], 1-allyl-3-ethylimidazolium bromide [AEImBr], 1-allyl-3-ethylimidazolium tetrafluoroborate [AEImBF4], 1-allyl-3-ethylimidazolium bis(trifluoromethanesulfonyl)imide [AEImTFSI], 1,3-diallylimidazolium bromide [AAImBr], 1,3-diallylimidazolium tetrafluoroborate [AAImBF4], and 1,3-diallylimidazolium bis(trifluoromethanesulfonyl)imide [AAImTFSI].

Examples of the electrolyte salt include lithium salts, sodium salts, and potassium salts of $PF_6^-$, $BF_4^-$, $(CF_3SO_2)_2N^-$ [TFSI]. $CF_3SO_3^-$ [TFS], $(C_2F_5SO_2)_2N^-$ [BETI], $ClO_4^-$, $AsF_6^-$, $SbF_6^-$, $B(C_2O_4)_2^-$ [BOB], $BF_2OCOOC(CF_3)_3^-$ [B(HHIB)], and so on. These electrolyte salts may be used singly or in a mixture of two or more of them. Particularly preferred are lithium salts, sodium salts, and potassium salts of $PF_6^-$ and $BF_4^-$, which are inexpensive. The electrolyte salt concentration is appropriately adjusted, generally, within a range of not less than 0.5 M and not more than 3 M.

The nonaqueous electrolyte may contain an additive, such as vinylene carbonate [VC], vinylene acetate [VA], vinylene butyrate, vinylene hexanoate, vinylene crotonate or catechol carbonate. These additives serve to form a protective film ($LiCO_x$ or the like) on the surface of the negative-electrode active material. The amount of additive is, per 100 parts by mass of nonaqueous electrolyte, preferably 0.1 to 3 parts by mass and particularly preferably 0.5 to 1 parts by mass. If the amount of additive is too small, the above effect is less likely to be achieved. On the other hand, even if the amount of additive is too large, improvement in the above effect is less likely to be achieved.

When alkali ions supplied from the positive electrode to the negative electrode are lithium ions, examples of the solid electrolyte include lithium β-alumina, lithium β"-alumina, $Li_2S$—$P_2S_5$ glass or crystallized glass, $Li_{1+x}AL_xGe_{2-x}(PO_4)_3$ crystal or crystallized glass, $Li1_4Al0_{.4}(Ge_2-xTi_x)1.6(PO_4)_3$ crystal or crystallized glass, $Li_{3x}La_{2/3-x}TiO_3$ crystal or crystallized glass, $Li_{0.8}La_{0.6}Zr_2(PO_4)_3$ crystal or crystallized glass, $Li_{1+x}Ti_{2-x}Al_x(PO_4)_3$ crystal or crystallized glass, $L_{1+x+y}Ti_{2-x}Al_xSi_y(PO_4)_{3-y}$ crystal or crystallized glass, and $LiTi_xZr_{2-x}(PO_4)_3$ crystal or crystallized glass. When the alkali ions are sodium ions, examples of the solid electrolyte include sodium β-alumina, sodium β"-alumina, $Na_{1+x}Zr_2Si_xP_{3-x}O1_2$ crystal or crystallized glass, $Na_{3.12}Si_2Zr_{1.88}Y_{0.12}PO_{12}$ crystal or crystallized glass, and $Na_{5.9}Sm_{0.6}Al_{0.1}P_{0.3}Si_{3.6}O_9$ crystallized glass. When the alkali ions are potassium ions, examples of the electrolyte salt include potassium β-alumina and potassium β"-alumina.

Among the above electrolytes, nonaqueous electrolytes and solid electrolytes are preferred because of their wide potential windows. Particularly, solid electrolytes having alkali-ion conductivity have wide potential windows and, therefore, produce little gas due to electrolyte decomposition during charge and discharge, so that the safety of the power storage device can be increased.

In a power storage device based on an electrolytic solution in which an aqueous electrolyte or a nonaqueous electrolyte is used, a separator is preferably provided between the electrodes. The separator is made of a material having insulation properties and specific examples of the material that can be used include porous film or non-woven fabric obtained from a polymer, such as polyolefin, cellulose, polyethylene terephthalate or vinylon; non-woven glass fabric containing glass fibers; glass cloth in which glass fibers are woven, and film-like glass.

The type of positive-electrode active material for use in the positive electrode is not particularly limited and can be appropriately selected depending on the type or so on of the desired power storage device. For example, in a sodium-ion secondary battery, examples of the positive-electrode active material include $NaFeO_2$, $NaNiO_2$, $NaCoO_2$, $NaMnO_2$, $NaVO_2$, $Na(Ni_xMn_{1-x})O_2$, $Na(Fe_xMn_{1-x})O_2$ (where 0<x<1), $NaVPO_4$, $Na_2FeP_2O_7$, and $Na_3V_2(PO_4)_3$. In a lithium-ion secondary battery, examples of the positive-electrode active material include $LiCoO_2$, $LiNiO_2$, $LiCo_{1/3}Ni_{1/3}Mn_{1/3}O_2$, $LiVO_2$, $LiCrO_2$, $LiMn_2O_4$, $LiFePO_4$, and $LiMnPO_4$.

After a power storage device in which the negative-electrode active material for a power storage device according to the present invention is used is charged and discharged, the negative-electrode active material may contain an oxide of lithium, sodium or potassium, an oxide containing $Ti^{4+}$, $Ti^{3+}$ or $Ti^{2+}$, or like substances. For example, the negative-electrode active material for a power storage device according to the present invention contains, at the completion of discharge, in terms of % by mole of oxide, 1 to 75% $R_2O$ (where R represents at least one selected from Li, Na, and K), 0.5 to 59% $TiO_2$, and 10 to 65% $P_2O_5$+$SiO_2$+$B_2O_3$+$Al_2O_3$+R'O (where R' represents at least one selected from Mg, Ca, Sr, Ba, and Zn). Here, in the sodium-ion secondary battery, the term "at the completion of discharge" refers to a state where, in a test cell in which the negative-electrode active material for a power storage device according to the present invention is used as a negative electrode, metallic sodium is used as a positive electrode, and a 1M $NaPF_6$ solution/EC:DEC=1:1 is used as an electrolytic solution, the cell has been charged at a constant current of 0.1 C rate to 0.5 V (vs. $Na^+$/Na) and then discharged at a constant current of 0.1 C rate to 2.5 V. Furthermore, in the lithium-ion secondary battery, the term "at the completion of discharge" refers to a state where, in a test cell in which the negative-electrode active material for a power storage device according to the present invention is used as a negative electrode, metallic lithium is used as a positive electrode, and a 1M $NaPF_6$ solution/EC:DEC=1:1 is used as an electrolytic solution, the cell has been charged at a constant current of 0.1 C rate to 1.5 V (vs. $Li^+$/Li) and then discharged at a constant current of 0.1 C rate to 3.2 V.

Although the description has heretofore been given mainly of the case where the power storage device is an alkali-ion secondary battery, such as a lithium-ion secondary battery or a sodium-ion secondary battery, the present invention is not limited to them and is also applicable to, for example, a hybrid capacitor in which a negative-electrode active material for use in a lithium-ion secondary battery, a sodium-ion secondary battery or like battery is combined with a positive electrode material for a nonaqueous electric double layer capacitor.

Each of a lithium-ion capacitor and a sodium-ion capacitor which are hybrid capacitors is a type of asymmetric capacitor having different charge/discharge principles between the positive and negative electrodes. The lithium-ion capacitor has a structure in which a negative electrode for a lithium-ion secondary battery is combined with a positive electrode for an electric double layer capacitor. The sodium-ion capacitor has a structure in which a negative electrode for a sodium-ion secondary battery is combined with a positive electrode for an electric double layer capacitor. In these cases, the positive electrode has an electric double layer formed on the surface thereof and is charged and discharged using a physical action (electrostatic action), while the negative electrode is charged and discharged, like the previously described lithium-ion secondary battery or sodium-ion secondary battery, by a chemical reaction (insertion and extraction) of lithium ions or sodium ions.

For the positive electrodes of the lithium-ion capacitor and the sodium-ion capacitor, a positive-electrode active material is used which is made of, for example, carbonaceous powder having a high specific surface area, such as activated charcoal, polyacene or mesophase carbon. On the other hand, for the negative electrodes thereof, the negative-electrode active material according to the present invention can be used.

When the negative-electrode active material according to the present invention is used in the lithium-ion capacitor or the sodium-ion capacitor, it is necessary to previously insert lithium ions or sodium ions and electrons in the negative-electrode active material. The means for implementing this is not particularly limited. For example, a metallic lithium electrode or a metallic sodium electrode, which serves as a supply source of lithium ions or sodium ions and electrons, may be placed in a capacitor cell and brought into contact directly or through a conductor with a negative electrode containing the negative-electrode active material according to the present invention. Alternatively, after previously inserting lithium ions or sodium ions and electrons in the negative-electrode active material according to the present invention in a separate cell, the negative-electrode active material may be incorporated into a capacitor cell.

Examples

Hereinafter, a description will be given, as examples of the negative-electrode active material for a power storage device according to the present invention, of working examples applied to secondary batteries in which a non-aqueous electrolyte or a solid electrolyte is used, but the present invention is not Limited to these Working Examples.

Secondary Battery Using Nonaqueous Electrolyte

Tables 1 to 14 show working examples (Nos. 1 to 86) of the present invention and comparative examples (Nos. 87 and 88).

TABLE 1

| | | 1 | 2 | 3 | 4 | 5 | 6 | 7 | 8 |
|---|---|---|---|---|---|---|---|---|---|
| Composition | $Li_2O$ | | | | | | | | |
| (% by mole) | $Na_2O$ | 3 | 3 | 2 | 3 | 12 | 30 | 35 | 37.4 |
| | $K_2O$ | | | | | | | | |
| | $TiO_2$ | 72 | 67 | 65 | 64 | 49 | 40 | 35 | 34.6 |
| | $P_2O_5$ | 25 | 30 | 33 | 33 | 39 | 30 | 30 | 28 |
| | $SiO_2$ | | | | | | | | |
| | $B_2O_3$ | | | | | | | | |
| | $TiO_2/(P_2O_5 + SiO_2 + B_2O_3 + Al_2O_3 + R'O)$ | 2.88 | 2.23 | 1.97 | 1.94 | 1.26 | 1.33 | 1.17 | 1.24 |
| | $R_2O/(P_2O_5 + SiO_2 + B_2O_3 + Al_2O_3 + R'O)$ | 0.12 | 0.10 | 0.06 | 0.09 | 0.31 | 1.00 | 1.17 | 1.34 |
| | Amorphous Phase (% by mass) | 100 | 100 | 100 | 100 | 100 | 100 | 100 | 100 |
| | Type of Precipitated Crystal | — | — | — | — | — | — | — | — |
| NIB Battery Characteristics | Discharge Capacity (mAh/g) | 172.5 | 154.3 | 148.7 | 145.5 | 95.9 | 94.1 | 80.7 | 84.4 |
| | Discharge Voltage (V) | 1.77 | 1.77 | 1.77 | 1.77 | 1.75 | 1.69 | 1.70 | 1.70 |
| | First Charge/Discharge Efficiency (%) | 84 | 85 | 84 | 84 | 83 | 89 | 90 | 90 |
| | Discharge Capacity Retention (%) | 73 | 74 | 76 | 78 | 80 | 86 | 88 | 87 |
| LIB Battery Characteristics | Discharge Capacity (mAh/g) | 166.3 | 157.2 | 165.5 | 155.7 | 89.3 | 89.9 | 76.5 | 98.8 |
| | Discharge Voltage (V) | 2.07 | 2.07 | 2.08 | 2.09 | 2.08 | 2.04 | 2.07 | 2.07 |
| | First Charge/Discharge Efficiency (%) | 86 | 87 | 78 | 82 | 83 | 89 | 85 | 85 |
| | Discharge Capacity Retention (%) | 74 | 75 | 78 | 80 | 84 | 89 | 90 | 91 |

TABLE 2

| | | 9 | 10 | 11 | 12 | 13 | 14 | 15 | 16 |
|---|---|---|---|---|---|---|---|---|---|
| Composition | $Li_2O$ | | | | | | | | |
| (% by mole) | $Na_2O$ | 40.2 | 3.3 | 35 | 42.1 | 42 | 40 | 45.4 | 45.3 |
| | $K_2O$ | | | | | | | | |
| | $TiO_2$ | 32.6 | 30.32 | 30 | 26.4 | 26 | 25 | 23.9 | 20.8 |
| | $P_2O_5$ | 27.2 | 66.38 | 35 | 31.5 | 32 | 35 | 30.7 | 33.9 |
| | $SiO_2$ | | | | | | | | |
| | $B_2O_3$ | | | | | | | | |
| | $TiO_2/(P_2O_5 + SiO_2 + B_2O_3 + Al_2O_3 + R'O)$ | 1.20 | 0.46 | 0.86 | 0.84 | 0.82 | 0.71 | 0.78 | 0.61 |
| | $R_2O/(P_2O_5 + SiO_2 + B_2O_3 + Al_2O_3 + R'O)$ | 1.48 | 0.05 | 1.00 | 1.34 | 1.33 | 1.14 | 1.48 | 1.34 |
| | Amorphous Phase (% by mass) | 100 | 100 | 100 | 100 | 100 | 100 | 100 | 100 |
| | Type of Precipitated Crystal | — | — | — | — | — | — | — | — |
| NIB Battery Characteristics | Discharge Capacity (mAh/g) | 84.6 | 56.4 | 82.3 | 71.0 | 70.8 | 61.9 | 59.5 | 48.1 |
| | Discharge Voltage (V) | 1.69 | 1.78 | 1.70 | 1.70 | 1.70 | 1.71 | 1.69 | 1.70 |
| | First Charge/Discharge Efficiency (%) | 91 | 79 | 90 | 90 | 90 | 88 | 91 | 90 |
| | Discharge Capacity Retention (%) | 87 | 88 | 86 | 90 | 89 | 91 | 89 | 87 |
| LIB Battery Characteristics | Discharge Capacity (mAh/g) | 82.0 | 61.9 | 84.1 | 69.8 | 69.8 | 67.3 | 57.3 | 45.7 |
| | Discharge Voltage (V) | 2.06 | 2.15 | 2.07 | 2.07 | 2.07 | 2.08 | 2.06 | 2.07 |
| | First Charge/Discharge Efficiency (%) | 86 | 73 | 85 | 85 | 85 | 83 | 86 | 85 |
| | Discharge Capacity Retention (%) | 92 | 90 | 89 | 92 | 93 | 93 | 93 | 89 |

TABLE 3

|  |  | 17 | 18 | 19 | 20 | 21 | 22 |
|---|---|---|---|---|---|---|---|
| Composition (% by mole) | $Li_2O$ |  |  |  |  |  |  |
|  | $Na_2O$ | 30 | 40 | 50 | 47.5 | 50 | 51 |
|  | $K_2O$ |  |  |  |  |  |  |
|  | $TiO_2$ | 20 | 20 | 20 | 19 | 15 | 10.7 |
|  | $P_2O_5$ | 50 | 40 | 30 | 33.5 | 35 | 38.3 |
|  | $SiO_2$ |  |  |  |  |  |  |
|  | $B_2O_3$ |  |  |  |  |  |  |
|  | $TiO_2/(P_2O_5 + SiO_2 + B_2O_3 + Al_2O_3 + R'O)$ | 0.40 | 0.50 | 0.67 | 0.57 | 0.43 | 0.28 |
|  | $R_2O/(P_2O_5 + SiO_2 + B_2O_3 + Al_2O_3 + R'O)$ | 0.60 | 1.00 | 1.67 | 1.42 | 1.43 | 1.33 |
|  | Amorphous Phase (% by mass) | 100 | 100 | 100 | 100 | 100 | 100 |
|  | Type of Precipitated Crystal | — | — | — | — | — | — |
| NIB Battery Characteristics | Discharge Capacity (mAh/g) | 49.8 | 54.0 | 57.9 | 54.3 | 42.4 | 30.3 |
|  | Discharge Voltage (V) | 1.72 | 1.70 | 1.68 | 1.69 | 1.69 | 1.70 |
|  | First Charge/Discharge Efficiency (%) | 87 | 90 | 93 | 91 | 91 | 90 |
|  | Discharge Capacity Retention (%) | 91 | 89 | 88 | 91 | 93 | 94 |
| LIB Battery Characteristics | Discharge Capacity (mAh/g) | 50.4 | 53.8 | 57.5 | 54.6 | 42.2 | 30.3 |
|  | Discharge Voltage (V) | 2.09 | 2.07 | 2.05 | 2.06 | 2.06 | 2.07 |
|  | First Charge/Discharge Efficiency (%) | 84 | 85 | 88 | 86 | 86 | 85 |
|  | Discharge Capacity Retention (%) | 93 | 90 | 90 | 92 | 93 | 94 |

TABLE 4

|  |  | 23 | 24 | 25 | 26 | 27 | 28 | 29 | 30 |
|---|---|---|---|---|---|---|---|---|---|
| Composition (% by mole) | $Li_2O$ | 12.5 | 20 | 30 | 40 | 50 | 48 | 42.5 | 50 |
|  | $Na_2O$ |  |  |  |  |  |  |  |  |
|  | $K_2O$ |  |  |  |  |  |  |  |  |
|  | $TiO_2$ | 50 | 45.7 | 40 | 34.3 | 30 | 15 | 15 | 20 |
|  | $P_2O_5$ | 37.5 | 34.3 | 30 | 25.7 | 20 | 37 | 42.5 | 30 |
|  | $SiO_2$ |  |  |  |  |  |  |  |  |
|  | $B_2O_3$ |  |  |  |  |  |  |  |  |
|  | $TiO_2/(P_2O_5 + SiO_2 + B_2O_3 + Al_2O_3 + R'O)$ | 1.33 | 1.33 | 1.33 | 1.33 | 1.50 | 0.41 | 0.35 | 0.67 |
|  | $R_2O/(P_2O_5 + SiO_2 + B_2O_3 + Al_2O_3 + R'O)$ | 0.33 | 0.58 | 1.00 | 1.56 | 2.50 | 1.30 | 1.00 | 1.67 |
|  | Amorphous Phase (% by mass) | 100 | 100 | 100 | 100 | 100 | 100 | 100 | 100 |
|  | Type of Precipitated Crystal | — | — | — | — | — | — | — | — |
| NIB Battery Characteristics | Discharge Capacity (mAh/g) | 107.3 | 105.4 | 102.4 | 92.2 | 91.5 | 45.0 | 43.3 | 66.9 |
|  | Discharge Voltage (V) | 1.75 | 1.72 | 1.69 | 1.66 | 1.66 | 1.66 | 1.71 | 1.68 |
|  | First Charge/Discharge Efficiency (%) | 83 | 87 | 89 | 90 | 94 | 93 | 85.5 | 90 |
|  | Discharge Capacity Retention (%) | 85 | 86 | 87 | 88 | 84 | 91 | 93 | 88 |
| LIB Battery Characteristics | Discharge Capacity (mAh/g) | 101.1 | 99.6 | 97.2 | 86.4 | 85.9 | 43.8 | 42.5 | 65.7 |
|  | Discharge Voltage (V) | 2.16 | 2.15 | 2.11 | 2.04 | 1.98 | 2.04 | 2.1 | 2.01 |
|  | First Charge/Discharge Efficiency (%) | 87 | 89 | 89 | 90 | 93 | 92 | 89.8 | 92 |
|  | Discharge Capacity Retention (%) | 86 | 87 | 89 | 89 | 85 | 91 | 94 | 90 |

TABLE 5

|  |  | 31 | 32 | 33 |
|---|---|---|---|---|
| Composition (% by mole) | $Li_2O$ | 50 | 45 | 55 |
|  | $Na_2O$ |  |  |  |
|  | $K_2O$ |  |  |  |
|  | $TiO_2$ | 15 | 25 | 15 |
|  | $P_2O_5$ | 35 | 30 | 30 |
|  | $SiO_2$ |  |  |  |
|  | $B_2O_3$ |  |  |  |
|  | $TiO_2/(P_2O_5 + SiO_2 + B_2O_3 + Al_2O_3 + R'O)$ | 0.43 | 0.83 | 0.50 |
|  | $R_2O/(P_2O_5 + SiO_2 + B_2O_3 + Al_2O_3 + R'O)$ | 1.43 | 1.50 | 1.83 |
|  | Amorphous Phase (% by mass) | 100 | 100 | 100 |
|  | Type of Precipitated Crystal | — | — | — |
| NIB Battery Characteristics | Discharge Capacity (mAh/g) | 50.5 | 84.2 | 55.6 |
|  | Discharge Voltage (V) | 1.69 | 1.66 | 1.67 |
|  | First Charge/Discharge Efficiency (%) | 88 | 92 | 92 |
|  | Discharge Capacity Retention (%) | 90 | 88 | 89 |
| LIB Battery Characteristics | Discharge Capacity (mAh/g) | 50.1 | 83.4 | 55.4 |
|  | Discharge Voltage (V) | 2.06 | 2.02 | 2.02 |
|  | First Charge/Discharge Efficiency (%) | 90 | 94 | 94 |
|  | Discharge Capacity Retention (%) | 91 | 90 | 91 |

TABLE 6

|  |  | 34 | 35 | 36 | 37 | 38 | 39 | 40 | 41 |
|---|---|---|---|---|---|---|---|---|---|
| Composition (% by mole) | $Li_2O$ |  |  |  |  |  |  |  |  |
|  | $Na_2O$ |  |  |  |  |  |  |  |  |
|  | $K_2O$ |  | 10 | 20 | 14 | 30 | 25 | 18 | 16 | 14 |
|  | $TiO_2$ |  | 70 | 60 | 60 | 50 | 50 | 50 | 50 | 50 |

TABLE 6-continued

|  |  | 34 | 35 | 36 | 37 | 38 | 39 | 40 | 41 |
|---|---|---|---|---|---|---|---|---|---|
|  | $P_2O_5$ | 20 | 20 | 26 | 20 | 25 | 32 | 34 | 36 |
|  | $SiO_2$ |  |  |  |  |  |  |  |  |
|  | $B_2O_3$ |  |  |  |  |  |  |  |  |
|  | $TiO_2/(P_2O_5 + SiO_2 + B_2O_3 + Al_2O_3 + R'O)$ | 3.50 | 3.00 | 2.31 | 2.50 | 2.00 | 1.56 | 1.47 | 1.39 |
|  | $R_2O/(P_2O_5 + SiO_2 + B_2O_3 + Al_2O_3 + R'O)$ | 0.50 | 1.00 | 0.54 | 1.50 | 1.00 | 0.56 | 0.47 | 0.39 |
|  | Amorphous Phase (% by mass) | 100 | 100 | 100 | 100 | 100 | 100 | 100 | 100 |
|  | Type of Precipitated Crystal | — | — | — | — | — | — | — | — |
| NIB Battery Characteristics | Discharge Capacity (mAh/g) | 162.2 | 137.0 | 136.1 | 97.8 | 102.4 | 111.0 | 111.8 | 103.6 |
|  | Discharge Voltage (V) | 1.73 | 1.68 | 1.73 | 1.67 | 1.73 | 1.73 | 1.75 | 1.76 |
|  | First Charge/Discharge Efficiency (%) | 86 | 88 | 85 | 91 | 86 | 86 | 83 | 82 |
|  | Discharge Capacity Retention (%) | 74 | 78 | 78 | 80 | 80 | 82 | 83 | 83 |
| LIB Battery Characteristics | Discharge Capacity (mAh/g) | 153.5 | 130.6 | 130.5 | 89.6 | 95.8 | 107.0 | 108.2 | 98.6 |
|  | Discharge Voltage (V) | 2.11 | 2.07 | 2.04 | 2.05 | 2.07 | 2.06 | 2.08 | 2.09 |
|  | First Charge/Discharge Efficiency (%) | 87 | 89 | 87 | 91 | 87 | 87 | 84 | 83 |
|  | Discharge Capacity Retention (%) | 75 | 79 | 79 | 81 | 81 | 81 | 84 | 83 |

TABLE 7

|  |  | 42 | 43 | 44 | 45 | 46 | 47 | 48 | 49 |
|---|---|---|---|---|---|---|---|---|---|
| Composition (% by mole) | $Li_2O$ |  |  |  |  |  |  |  |  |
|  | $Na_2O$ |  |  |  |  |  |  |  |  |
|  | $K_2O$ | 12 | 23.3 | 25 | 20.9 | 30 | 20.5 | 20 | 40 |
|  | $TiO_2$ | 50 | 46.5 | 45 | 41.8 | 40 | 38.4 | 40 | 30 |
|  | $P_2O_5$ | 38 | 30.3 | 30 | 37.3 | 30 | 36.6 | 40 | 30 |
|  | $SiO_2$ |  |  |  |  |  | 4.5 |  |  |
|  | $B_2O_5$ |  |  |  |  |  |  |  |  |
|  | $TiO_2/(P_2O_5 + SiO_2 + B_2O_3 + Al_2O_3 + R'O)$ | 1.32 | 1.54 | 1.50 | 1.12 | 1.33 | 0.93 | 1.00 | 1.00 |
|  | $R_2O/(P_2O_5 + SiO_2 + B_2O_3 + Al_2O_3 + R'O)$ | 0.32 | 0.77 | 0.83 | 0.56 | 1.00 | 0.50 | 0.50 | 1.33 |
|  | Amorphous Phase (% by mass) | 100 | 100 | 100 | 100 | 100 | 100 | 100 | 100 |
|  | Type of Precipitated Crystal | — | — | — | — | — | — | — | — |
| NIB Battery Characteristics | Discharge Capacity (mAh/g) | 97.4 | 91.2 | 100.2 | 77.6 | 83.3 | 83.0 | 86.7 | 66.1 |
|  | Discharge Voltage (V) | 1.76 | 1.73 | 1.71 | 1.75 | 1.72 | 1.75 | 1.75 | 1.70 |
|  | First Charge/Discharge Efficiency (%) | 81 | 85 | 88 | 83 | 87 | 82 | 83 | 90 |
|  | Discharge Capacity Retention (%) | 82 | 84 | 86 | 87 | 86 | 87 | 87 | 87 |
| LIB Battery Characteristics | Discharge Capacity (mAh/g) | 91.4 | 85.0 | 96.6 | 72.0 | 79.1 | 79.4 | 84.1 | 63.9 |
|  | Discharge Voltage (V) | 2.09 | 2.06 | 2.04 | 2.08 | 2.05 | 2.12 | 2.12 | 2.07 |
|  | First Charge/Discharge Efficiency (%) | 82 | 86 | 89 | 84 | 88 | 84 | 84 | 91 |
|  | Discharge Capacity Retention (%) | 83 | 87 | 87 | 88 | 87 | 88 | 88 | 88 |

TABLE 8

|  |  | 50 | 51 | 52 | 53 |
|---|---|---|---|---|---|
| Composition (% by mole) | $Li_2O$ |  |  |  |  |
|  | $Na_2O$ |  |  |  |  |
|  | $K_2O$ | 30 | 50 | 40 | 30 |
|  | $TiO_2$ | 30 | 20 | 20 | 20 |
|  | $P_2O_5$ | 40 | 30 | 40 | 50 |
|  | $SiO_2$ |  |  |  |  |
|  | $B_2O_5$ |  |  |  |  |
|  | $TiO_2/(P_2O_5 + SiO_2 + B_2O_3 + Al_2O_3 + R'O)$ | 0.75 | 0.67 | 0.50 | 0.40 |
|  | $R_2O/(P_2O_5 + SiO_2 + B_2O_3 + Al_2O_3 + R'O)$ | 0.75 | 1.67 | 1.00 | 0.60 |
|  | Amorphous Phase (% by mass) | 100 | 100 | 100 | 100 |
|  | Type of Precipitated Crystal | — | — | — | — |
| NIB Battery Characteristics | Discharge Capacity (mAh/g) | 71.8 | 44.7 | 43.5 | 37.5 |
|  | Discharge Voltage (V) | 1.74 | 1.68 | 1.72 | 1.74 |
|  | First Charge/Discharge Efficiency (%) | 85 | 89 | 87 | 83 |
|  | Discharge Capacity Retention (%) | 88 | 88 | 89 | 89 |
| LIB Battery Characteristics | Discharge Capacity (mAh/g) | 71.4 | 43.5 | 42.5 | 35.7 |
|  | Discharge Voltage (V) | 2.11 | 2.05 | 2.09 | 2.11 |
|  | First Charge/Discharge Efficiency (%) | 86 | 90 | 88 | 85 |
|  | Discharge Capacity Retention (%) | 89 | 89 | 90 | 90 |

TABLE 9

|  |  | 54 | 55 | 56 | 57 | 58 | 59 | 60 | 61 | 62 |
|---|---|---|---|---|---|---|---|---|---|---|
| Composition (% by mole) | $Li_2O$ |  |  |  |  |  |  |  |  |  |
|  | $Na_2O$ |  |  |  |  |  |  |  |  |  |
|  | $K_2O$ |  |  |  |  |  |  |  |  |  |

TABLE 9-continued

|  |  | 54 | 55 | 56 | 57 | 58 | 59 | 60 | 61 | 62 |
|---|---|---|---|---|---|---|---|---|---|---|
|  | $TiO_2$ | 95 | 90 | 80 | 72 | 70 | 60 | 50 | 40 | 30 |
|  | $P_2O_5$ | 5 | 10 | 20 | 28 | 30 | 40 | 50 | 60 | 70 |
|  | $SiO_2$ |  |  |  |  |  |  |  |  |  |
|  | $B_2O_3$ |  |  |  |  |  |  |  |  |  |
|  | $TiO_2/(P_2O_5 + SiO_2 + B_2O_3 + Al_2O_3 + R'O)$ | 19.00 | 9.00 | 4.00 | 2.57 | 2.33 | 1.50 | 1.00 | 0.67 | 0.43 |
|  | $R_2O/(P_2O_5 + SiO_2 + B_2O_3 + Al_2O_3 + R'O)$ | 0.00 | 0.00 | 0.00 | 0.00 | 0.00 | 0.00 | 0.00 | 0.00 | 0.00 |
|  | Amorphous Phase (% by mass) | 100 | 100 | 100 | 100 | 100 | 100 | 100 | 100 | 100 |
|  | Type of Precipitated Crystal | — | — | — | — | — | — | — | — | — |
| NIB Battery Characteristics | Discharge Capacity (mAh/g) | 255.9 | 239.2 | 198.3 | 180.4 | 165.5 | 147.6 | 119.8 | 90.5 | 62.2 |
|  | Discharge Voltage (V) | 1.84 | 1.84 | 1.83 | 1.82 | 1.81 | 1.8 | 1.79 | 1.78 | 1.77 |
|  | First Charge/Discharge Efficiency (%) | 86 | 82 | 83 | 82 | 82 | 79 | 78 | 73 | 70 |
|  | Discharge Capacity Retention (%) | 70 | 71 | 74 | 74 | 76 | 83 | 85 | 87 | 87 |
| LIB Battery Characteristics | Discharge Capacity (mAh/g) | 261.5 | 231.0 | 191.5 | 180.8 | 160.5 | 146.4 | 119.6 | 90.3 | 61.6 |
|  | Discharge Voltage (V) | 2.14 | 2.14 | 2.13 | 2.12 | 2.11 | 2.1 | 2.09 | 2.08 | 2.07 |
|  | First Charge/Discharge Efficiency (%) | 86 | 82 | 81 | 81 | 82 | 80 | 80 | 77 | 76 |
|  | Discharge Capacity Retention (%) | 71 | 71 | 75 | 75 | 77 | 84 | 86 | 88 | 88 |

TABLE 10

|  |  | 63 | 64 | 65 | 66 | 67 | 68 |
|---|---|---|---|---|---|---|---|
| Composition (% by mole) | $Li_2O$ |  |  |  |  |  |  |
|  | $Na_2O$ | 14 | 20 | 20 |  | 20 | 30 |
|  | $K_2O$ |  |  |  | 20 |  |  |
|  | $TiO_2$ | 38 | 25 | 30 | 37 | 35 | 40 |
|  | $P_2O_5$ | 27 | 30 | 30 | 26 | 30 | 30 |
|  | $SiO_2$ |  |  |  |  |  |  |
|  | $B_2O_3$ |  |  |  |  |  |  |
|  | $Nb_2O_5$ | 16 | 20 | 15 | 10 | 10 |  |
|  | $Al_2O_3$ | 5 | 5 | 5 |  | 5 |  |
|  | ZnO |  |  |  | 7 |  |  |
|  | $TiO_2/(P_2O_5 + SiO_2 + B_2O_3 + Al_2O_3 + R'O)$ | 1.19 | 0.71 | 0.86 | 1.12 | 1.00 | 1.33 |
|  | $R_2O/(P_2O_5 + SiO_2 + B_2O_3 + Al_2O_3 + R'O)$ | 0.44 | 0.57 | 0.57 | 0.61 | 0.57 | 1.00 |
|  | Amorphous Phase (% by mass) | 100 | 100 | 100 | 100 | 100 | 100 |
|  | Type of Precipitated Crystal | — | — | — | — | — | — |
| NIB Battery Characteristics | Discharge Capacity (mAh/g) | 144.0 | 127.0 | 126.8 | 128.0 | 126.6 | 91.0 |
|  | Discharge Voltage (V) | 1.68 | 1.66 | 1.66 | 1.66 | 1.66 | 1.62 |
|  | First Charge/Discharge Efficiency (%) | 85 | 88 | 87 | 88 | 88 | 95 |
|  | Discharge Capacity Retention (%) | 82 | 86 | 86 | 85 | 88 | 90 |
| LIB Battery Characteristics | Discharge Capacity (mAh/g) | 144.3 | 126.2 | 126.2 | 128.0 | 126.2 | Not measured |
|  | Discharge Voltage (V) | 1.98 | 1.96 | 1.96 | 1.96 | 1.96 |  |
|  | First Charge/Discharge Efficiency (%) | 85 | 88 | 85 | 87 | 88 |  |
|  | Discharge Capacity Retention (%) | 83 | 86 | 87 | 86 | 89 |  |

TABLE 11

|  |  | 69 | 70 | 71 | 72 | 73 | 74 |
|---|---|---|---|---|---|---|---|
| Composition (% by mole) | $Li_2O$ |  |  |  |  |  |  |
|  | $Na_2O$ | 35 | 20 | 33 | 25 | 25 | 20 |
|  | $K_2O$ |  |  |  |  |  |  |
|  | $TiO_2$ | 29 | 40 | 33 | 25 | 25 | 40 |
|  | $P_2O_5$ | 7 |  |  |  |  |  |
|  | $SiO_2$ | 29 | 40 | 33 | 50 | 50 | 40 |
|  | $B_2O_3$ |  |  |  |  |  |  |
|  | $Nb_2O_5$ |  |  |  |  |  |  |
|  | $Al_2O_3$ |  |  |  |  |  |  |
|  | ZnO |  |  |  |  |  |  |
|  | $TiO_2/(P_2O_5 + SiO_2 + B_2O_3 + Al_2O_3 + R'O)$ | 0.81 | 1.00 | 1.00 | 0.50 | 0.50 | 1.00 |
|  | $R_2O/(P_2O_5 + SiO_2 + B_2O_3 + Al_2O_3 + R'O)$ | 0.97 | 0.50 | 1.00 | 0.50 | 0.50 | 0.50 |
|  | Firing Temperature (° C.) | 600 | 600 | 600 | 600 | 850 | 800 |
|  | Firing Time (hour) | 1 | 1 | 1 | 1 | 1 | 5 |
|  | Amorphous Phase (% by mass) | 78.5 | 100 | 75.4 | 100 | 42 | 38 |
|  | Type of Precipitated Crystal | $Na_3PO_4$ | — | $Na_2TiSiO_5$ $Na_2Ti_2O_3(Si_2O_6)$ $Ti_3O_5$ $Na_{0.57}Ti_2O_4$ | — | $Na_2Ti_6O_{13}$ | $Na_{0.23}TiO_2$ $Na_{0.8}Ti_4O_8$ $Na_2Ti_2Ti_6O_{16}$ |
| NIB Battery | Discharge Capacity (mAh/g) | 82.6 | 128.2 | 57.4 | 64.1 | 67.0 | 109.0 |
|  | Discharge Voltage (V) | 0.79 | 0.92 | 0.49 | 0.82 | 0.98 | 0.91 |

TABLE 11-continued

|  |  | 69 | 70 | 71 | 72 | 73 | 74 |
|---|---|---|---|---|---|---|---|
| Characteristics | First Charge/Discharge Efficiency (%) | 71 | 81 | 66 | 66 | 72 | 72 |
|  | Discharge Capacity Retention (%) | 92 | 98 | 99 | 99 | 96 | 93 |

TABLE 12

|  |  | 75 | 76 | 77 | 78 | 79 | 80 | 81 | 82 |
|---|---|---|---|---|---|---|---|---|---|
| Composition (% by mole) | $Li_2O$ |  |  |  |  |  |  |  |  |
|  | $Na_2O$ | 18 | 25 | 27 | 25 | 12 | 30 |  |  |
|  | $K_2O$ |  |  |  |  |  |  |  |  |
|  | $TiO_2$ | 46 | 50 | 55 | 58 | 45 | 52 | 67 | 70 |
|  | $P_2O_5$ |  |  |  |  |  |  |  |  |
|  | $SiO_2$ | 36 | 25 | 18 | 17 | 23 |  |  |  |
|  | $B_2O_3$ |  |  |  |  |  |  |  |  |
|  | $Nb_2O_5$ |  |  |  |  | 20 |  |  |  |
|  | $Al_2O_3$ |  |  |  |  |  | 18 |  |  |
|  | ZnO |  |  |  |  |  |  |  |  |
|  | BaO |  |  |  |  |  |  | 33 | 8 |
|  | CaO |  |  |  |  |  |  |  | 22 |
|  | $TiO_2/(P_2O_5 + SiO_2 + B_2O_3 + Al_2O_3 + R'O)$ | 1.28 | 2.00 | 3.06 | 3.41 | 1.96 | 2.89 | 2.03 | 2.33 |
|  | $R_2O/(P_2O_5 + SiO_2 + B_2O_3 + Al_2O_3 + R'O)$ | 0.50 | 1.00 | 1.50 | 1.47 | 0.52 | 1.67 | 0.00 | 0.00 |
|  | Firing Temperature (° C.) | 550 | 550 | 550 | 550 | 550 | 550 | 550 | 550 |
|  | Firing Time (hour) | 1 | 1 | 1 | 1 | 1 | 1 | 1 | 1 |
|  | Amorphous Phase (% by mass) | 100 | 100 | 100 | 100 | 100 | 100 | 100 | 100 |
|  | Type of Precipitated Crystal | — | — | — | — | — | — | — | — |
| NIB Battery Characteristics | Discharge Capacity (mAh/g) | 119.4 | 103.9 | 90.7 | 102.2 | 171.3 | 52.1 | 178.1 | 181.0 |
|  | Discharge Voltage (V) | 0.99 | 0.70 | 0.62 | 0.67 | 0.88 | 0.68 | 0.91 | 0.87 |
|  | First Charge/Discharge Efficiency (%) | 79 | 79 | 76 | 78 | 81 | 72 | 63 | 64 |
|  | Discharge Capacity Retention (%) | 109 | 110 | 112 | 113 | 99 | 93 | 71 | 70 |
| LIB Battery Characteristics | Discharge Capacity (mAh/g) | — | 187.4 | — | 172 | — | — | — | — |
|  | Discharge Voltage (V) | — | 1.07 | — | 1.09 | — | — | — | — |
|  | First Charge/Discharge Efficiency (%) | — | 60 | — | 62 | — | — | — | — |
|  | Discharge Capacity Retention (%) | — | 86 | — | 89 | — | — | — | — |

TABLE 13

|  |  | 83 | 84 | 85 | 86 |
|---|---|---|---|---|---|
| Composition (% by mole) | $Li_2O$ |  |  |  |  |
|  | $Na_2O$ | 18 | 25 | 30 |  |
|  | $K_2O$ |  |  |  |  |
|  | $TiO_2$ | 46 | 50 | 52 | 74 |
|  | $P_2O_5$ |  |  |  | 26 |
|  | $SiO_2$ | 36 | 25 |  |  |
|  | $B_2O_3$ |  |  |  |  |
|  | $Nb_2O_5$ |  |  |  |  |
|  | $Al_2O_3$ |  |  | 18 |  |
|  | ZnO |  |  |  |  |
|  | BaO |  |  |  |  |
|  | $TiO_2/(P_2O_5 + SiO_2 + B_2O_3 + Al_2O_3 + R'O)$ | 1.28 | 2.00 | 2.89 | 2.85 |
|  | $R_2O/(P_2O_5 + SiO_2 + B_2O_3 + Al_2O_3 + R'O)$ | 0.50 | 1.00 | 1.67 | 0.00 |
|  | Firing Temperature (° C.) | — | — | — | — |
|  | Firing Time (hour) | — | — | — | — |
|  | Amorphous Phase (% by mass) | 100 | 100 | 100 | 100 |
|  | Type of Precipitated Crystal | — | — | — | — |
| NIB Battery Characteristics | Discharge Capacity (mAh/g) | 119.4 | 103.9 | 52.1 | 242.0 |
|  | Discharge Voltage (V) | 0.99 | 0.70 | 0.68 | 1.09 |
|  | First Charge/Discharge Efficiency (%) | 79 | 79 | 72 | 54 |
|  | Discharge Capacity Retention (%) | 109 | 110 | 93 | 70 |

TABLE 14

|  |  | 87 | 88 |
|---|---|---|---|
| Composition (% by mole) | $Li_2O$ |  | 12.5 |
|  | $Na_2O$ | 12.5 |  |
|  | $K_2O$ |  |  |
|  | $TiO_2$ | 50 | 50 |
|  | $P_2O_5$ | 37.5 | 37.5 |
|  | $SiO_2$ |  |  |
|  | $B_2O_5$ |  |  |
|  | $TiO_2/(P_2O_5 + SiO_2 + B_2O_3 + Al_2O_3 + R'O)$ | 1.33 | 1.33 |
|  | $R_2O/(P_2O_5 + SiO_2 + B_2O_3 + Al_2O_3 + R'O)$ | 0.33 | 0.33 |
|  | Amorphous Phase (% by mass) | 1 | 8 |
|  | Type of Precipitated Crystal | $NaTi_2(PO_4)_3$ | $LiTi_2(PO_4)_2$ |
| NIB Battery | Discharge Capacity (mAh/g) | 130 | 130 |

TABLE 14-continued

|  |  | 87 | 88 |
|---|---|---|---|
| Characteristics | Discharge Voltage (V) | 2.16 | 2.15 |
|  | First Charge/Discharge Efficiency (%) | 96 | 94 |
|  | Discharge Capacity Retention (%) | 67 | 69 |
| LIB Battery Characteristics | Discharge Capacity (mAh/g) | 127 | 129 |
|  | Discharge Voltage (V) | 2.59 | 2.67 |
|  | First Charge/Discharge Efficiency (%) | 91 | 93 |
|  | Discharge Capacity Retention (%) | 69 | 68 |

(1) Preparation of Negative-Electrode Active Material

Using various oxides, carbonates, and so on as raw materials, powders of the raw materials were formulated to give each composition shown in Tables 1 to 14. The powders of raw materials were loaded into a platinum crucible and melted at 1200 to 1500° C. for 60 minutes in an air atmosphere using an electric furnace. Next, resultant molten glass was poured between a pair of rotating rollers and formed into a shape with rapid cooling, thus obtaining a film-like melt-solidified body having a thickness of 0.1 to 2 mm. The film-like melt-solidified body was ground with a ball mill and then air-classified to obtain negative-electrode active material in powder state having an average particle size of 2 μm. As for samples Nos. 81 and 82, the melt-solidified body was ground with a ball mill and the obtained powder was sprayed directly into burner flame, then rapidly cooled, and further ground with a jet mill to obtain a negative-electrode active material in powder state having an average particle size of 2 μm.

The obtained negative-electrode active material was coated with carbon in the following manner.

As for samples Nos. 1 to 67, 87, and 88 obtained in the above manner, 10.5 parts by mass of acetylene black (DENKA BLACK) as a conductive aid was added to 89.5 parts by mass of negative-electrode active material and these components were mixed at 300 rpm for 150 minutes using a planetary ball mill P6 manufactured by Fritsch GmbH, thus obtaining negative-electrode active material powder coated with electrically conductive carbon. The obtained negative-electrode active material powder was subjected to XRD to identify its structure.

As for samples Nos. 68 to 82, 100 parts by mass of negative-electrode active material obtained in the above manner was fully mixed with 21.4 parts by mass (corresponding to 12 parts by mass in carbon terms) of polyethylene oxide nonylphenyl ether (having an HLB value of 13.3 and a weight average molecular weight of 660), which is a non-ionic surfactant as a carbon source, and 10 parts by mass of ethanol, and the mixture was then dried at 100° C. for about an hour and fired in a nitrogen atmosphere at 600° C. for an hour (at 850° C. for an hour as for No. 73, at 800° C. for five hours as for No. 74, and at 550° C. for an hour as for Nos. 75 to 82), thus obtaining negative-electrode active material powder the surface of which was coated with carbon.

As for samples Nos. 83 to 86, the above negative-electrode active material was used as it was.

The XRD patterns of sample Nos. 6, 68, and 69 are shown in FIGS. 1 to 3, respectively. As shown in FIGS. 1 and 2, in each of the XRD patterns of samples Nos. 6 and 68, an amorphous halo was detected but no crystalline diffraction line was detected. Furthermore, also in each of the XRD patterns of samples Nos. 1 to 5, 7 to 67, 70, 72, and 75 to 86, an amorphous halo was likewise detected but no crystalline diffraction line was likewise detected. As shown in FIG. 3, in the XRD pattern of sample No. 69, an amorphous halo and crystalline diffraction lines attributed to $Na_3PO_4$ were detected. The content of the amorphous phase was determined by the previously described method. Moreover, also in each of the XRD patterns of samples Nos. 71, 73, and 74, an amorphous halo and crystalline diffraction lines were likewise detected. The contents of these amorphous phases were determined.

(2) Production of Negative Electrode

As for samples Nos. 1 to 67, 87, and 88, electrically conductive carbon black (Super C65 manufactured by Timcal) as a conductive aid and poly(vinylidene fluoride) as a binder were weighed and mixed with the negative-electrode active material powder to reach a ratio of negative-electrode active material powder to conductive aid to binder of 92:3:5 (mass ratio) and the mixture was dispersed into N-methylpyrrolidinone (NMP), followed by well stirring with a planetary centrifugal mixer to forma slurry, thus obtaining a negative electrode material. As for samples Nos. 68 to 86, the negative-electrode active material powder, the conductive aid, and the binder were weighed and mixed to reach a ratio of negative-electrode active material powder to conductive aid to binder of 85:5:10 (mass ratio) and the mixture was processed in the same manner as above, thus obtaining a negative electrode material.

Next, the obtained negative electrode material was coated on a 20-μm thick copper foil serving as a negative electrode current collector using a doctor blade with a gap of 125 μm, and the negative electrode material coated on the copper foil was vacuum-dried by a dryer at 70° C. and then pressed by passing it between a pair of rotating rollers to obtain an electrode sheet. This electrode sheet was punched out into an 11-mm diameter disc by an electrode cutting machine and the disc was dried at a temperature of 150° C. for eight hours under reduced pressure, thereby obtaining a circular negative electrode.

(3) Production of Test Cell

A test cell for a sodium-ion secondary battery (NIB) was produced in the following manner. The negative electrode obtained in the above manner was placed, with its copper foil surface down, on a lower lid of a coin cell, and a separator formed of a 16-mm diameter polypropylene porous film dried at 70° C. for eight hours under reduced pressure and a metallic sodium layer as a counter electrode were laminated on the negative electrode, thus producing a test cell. A 1M $NaPF_6$ solution/EC:DEC=1:1 (where EC is ethylene carbonate and DEC is diethyl carbonate) was used as an electrolytic solution. The assembly of the test cell was conducted in an environment at the dew-point temperature minus 70° C. or below.

A test cell for a lithium-ion secondary battery (LIB) was produced in the following manner. The negative electrode obtained in the above manner was placed, with its copper foil surface down, on a lower lid of a coin cell, and a separator formed of a 16-mm diameter polypropylene porous film dried at 70° C. for eight hours under reduced pressure and a metallic lithium layer as a counter electrode were laminated on the negative electrode, thus producing a test cell. A 1M $LiPF_6$ solution/EC:DEC=1:1 (where EC is ethylene carbonate and DEC is diethyl carbonate) was used as an electrolytic solution. The assembly of the test cell was conducted in an environment at the dew-point temperature minus 50° C. or below.

(4) Charge and Discharge Test

The test cell for a sodium-ion secondary battery was CC (constant-current) charged at 30° C. from an open circuit voltage to 0.5 V and its amount of electricity charged to the negative-electrode active material per unit mass (first charge capacity) was determined. Next, the test cell was CC discharged from 0.5 V to 2.5 V and its amount of electricity discharged from the negative-electrode active material per unit mass (first discharge capacity) was determined. However, as for the test cells Nos. 69 to 86, the first charge capacity was determined by charging them from the open circuit voltage to 0.01 V and, next, the first discharge capacity was determined by CC discharging them from 0.01 V to 2.5 V. The C rate was 0.1 C.

The test cell for a lithium-ion secondary battery was CC (constant-current) charged at 30° C. from an open circuit voltage to 1.5 V and its amount of electricity charged to the negative-electrode active material per unit mass (first charge capacity) was determined. Next, the test cell was CC discharged from 1.5 V to 3.2 V and its amount of electricity discharged from the negative-electrode active material per unit mass (first discharge capacity) was determined. However, as for the test cells Nos. 76 and 78, the first charge capacity was determined by charging them from the open circuit voltage to 0.01 V and, next, the first discharge capacity was determined by CC discharging them from 0.01 V to 2.5 V. The C rate was 0.1 C.

The results of the charge and discharge characteristics are shown in Tables 1 to 14. Furthermore, the first charge/discharge curves of the test cells for sodium-ion secondary batteries or lithium-ion secondary batteries using samples Nos. 6, 69 to 72, and 75 are shown in FIGS. 4 to 10, respectively. In the tables, "Discharge Capacity" refers to the first discharge capacity, "Discharge Voltage" refers to the average voltage during the first discharge, "First Charge/Discharge Efficiency" refers to the rate of the first discharge capacity to the first charge capacity, and "Discharge Capacity Retention" refers to the rate of the 100th cycle discharge capacity to the first discharge capacity.

As is obvious from Tables 1 to 14 and FIGS. 4 to 10, as for samples Nos. 1 to 86 which are working examples, the discharge voltage and discharge capacity retention in each of the test cells for sodium-ion secondary batteries were 1.84 V or less and 70% or more, respectively, the discharge voltage and discharge capacity retention in each of the test cells for lithium-ion secondary batteries were 2.16 V or less and 71% or more, respectively, and the working examples were excellent in these characteristics. Note that although some working examples exhibited a discharge capacity retention exceeding 100%, this can be attributed to the fact that a $SiO_2$ matrix enveloping Ti sites of the active material component was structurally relaxed owing to charge and discharge (insertion and extraction of sodium ions) to make the sodium ions more likely to be conducted. On the other hand, as for samples Nos. 87 and 88 which are comparative examples, the discharge voltage and discharge capacity retention in each of the test cells for sodium-ion secondary batteries were 2.15 V or more and 69% or less, respectively, the discharge voltage and discharge capacity retention in each of the test cells for lithium-ion secondary batteries were 2.59 V or more and 69% or less, respectively, and the comparative examples were poorer in these characteristics as compared to the working examples.

Secondary Battery Using Solid Electrolyte

Tables 15 and 16 show working examples (Nos. 89 to 93) of the present invention.

TABLE 15

| | | | 89 | 90 | 91 |
|---|---|---|---|---|---|
| Negative Electrode | Negative-Electrode Active Material Precursor | | 76 | 76 | 76 |
| Material (% by mass) | Solid Electrolyte | β-Alumina | 21 | 21 | — |
| | | (Stabilizing Agent) | ($Li_2O$) | (MgO) | |
| | | NASICON Crystal | — | — | 21 |
| | Electrically Conductive Carbon | | 3 | 3 | 3 |
| Solid Electrolyte | | | $Li_2O$-stabilized β"-alumina | MgO-stabilized β"-alumina | NASICON crystal |
| Negative-Electrode Active Material | Amorphous Phase (% by mass) | | 100 | 100 | 100 |
| | Type of Precipitated Crystal | | — | — | — |
| NIB Battery Characteristics | Discharge Capacity (mAh/g) | | 128 | 123 | 105 |
| | Discharge Voltage (V) | | 0.92 | 0.96 | 1.02 |
| | First Charge/Discharge Efficiency (%) | | 81 | 86 | 83 |
| | Discharge Capacity Retention (%) | | 99.5 | 99.5 | 98 |

TABLE 16

| | | 92 | 93 |
|---|---|---|---|
| Negative-Electrode Active Material Precursor Composition (% by mole) | $Na_2O$ | 33.3 | 20 |
| | $TiO_2$ | 33.3 | 40 |
| | $SiO_2$ | 33.3 | 40 |
| Negative Electrode Material (% by mass) | Negative-Electrode Active Material Precursor | 76 | 76 |
| | Solid Electrolyte | 21 | 21 |
| | Electrically Conductive Carbon | 3 | 3 |
| Solid Electrolyte | | $Li_2O$-stabilized β"-alumina | $Li_2O$-stabilized β"-alumina |
| Negative-Electrode Active Material | Amorphous Phase (% by mass) | 63 | 100 |
| | Type of Precipitated Crystal | $Na_2TiSiO_5$ $Na_2Ti_2O_3(Si_2O_6)$ $Ti_3O_5$ $Na_{0.57}Ti_2O_4$ | — |

TABLE 16-continued

|  |  | 92 | 93 |
|---|---|---|---|
| NIB Battery Characteristics | Discharge Capacity (mAh/g) | 36 | 37 |
| | Discharge Voltage (V) | 1.1 | 1.4 |
| | First Charge/Discharge Efficiency (%) | 88 | 97 |
| | Discharge Capacity Retention (%) | 160 | 283 |

(1) Preparation of Negative-Electrode Active Material Precursor Powder

In the case of Nos. 89 to 91, sodium metaphosphate ($NaPO_3$), titanium oxide ($TiO_2$), sodium carbonate ($Na_2CO_3$), silica ($SiO_2$), and orthophosphoric acid ($H_3PO_4$) were used as raw materials, powders of these raw materials were formulated to give a composition of, in % by mole, 20% $Na_2O$, 40% $TiO_2$, 35% $SiO_2$, and 5% $P_2O_5$, and the mixture was melted in an air atmosphere at 1250° C. for 45 minutes. In the case of Nos. 92 and 93, using various oxides, carbonates, and so on as raw materials, powders of the raw materials were formulated to give each composition shown in Table 16. Then, the mixture was melted in an air atmosphere at 1350° C. for 60 minutes. Thereafter, resultant melt was poured between a pair of rotating rollers and formed into a shape with rapid cooling, thus obtaining film-like glass having a thickness of 0.1 to 1 mm. This film-like glass was ground for five hours with a ball mill using a 20-mm diameter $ZrO_2$ ball and the ground product was passed through a resin-made sieve with 120-μm openings to obtain coarse glass powder having an average particle size of 3 to 15 μm. Furthermore, the coarse glass powder was ground, using ethanol as a grinding aid, for 80 hours with a ball mill using a 3-mm diameter $ZrO_2$ ball, thus obtaining glass powder (negative-electrode active material precursor powder) having an average particle size of 0.6 μm. As a result of XRD measurement, the glass powder was confirmed to be amorphous.

(2) Preparation of Sodium-Ion Conductive Solid Electrolyte ($Li_2O$-Stabilized β"-Alumina)

A $Li_2O$-stabilized β" alumina having a composition formula of $Na_{1.6}Li_{0.34}Al_{10.66}O_{17}$ (manufactured by Ionotec Ltd.) was processed by dry grinding to a thickness of 0.2 mm, thus obtaining a solid electrolyte sheet. Furthermore, solid electrolyte powder (having an average particle size of 13 μm) was separately prepared by grinding the obtained solid electrolyte sheet with a planetary ball mill and passing the ground product through a sieve with 10-μm openings.

(MgO-Stabilized β"-Alumina)

Sodium carbonate ($Na_2CO_3$), aluminum oxide ($Al_2O_3$), and magnesium oxide (MgO) were used as raw materials, powders of these raw materials were formulated to give a composition of, in % by mole, 13.0% $Na_2O$, 80.2% $Al_2O_3$, and 6.8% MgO, and the mixture was ground and mixed in ethanol for 10 hours with a ball mill using a 5-mm diameter $Al_2O_3$ ball. The obtained powder was formed into a 0.2-mm thick sheet, then isostatically pressed at a pressure of 40 MPa, and heat-treated in an air atmosphere at 1640° C. for an hour to obtain a solid electrolyte sheet made of MgO-stabilized β" alumina.

Furthermore, solid electrolyte powder (having an average particle size of 12 μm) was separately prepared by grinding the obtained solid electrolyte sheet with a planetary ball mill and passing the ground product through a sieve with 10-μm openings. When the powder X-ray diffraction pattern of the obtained solid electrolyte powder was checked, diffraction lines originating from (($Al_{10.32}Mg_{0.68}O_{16}$) ($Na_{1.68}O$)) which is a trigonal crystal belonging to space group R-3m were confirmed.

(NASICON Crystal)

Sodium metaphosphate ($NaPO_3$), yttria-stabilized zirconia (($ZrO_2$)$_{0.97}$($Y_2O_3$)$_{0.03}$), sodium carbonate ($Na_2CO_3$), and silicon oxide ($SiO_2$) were used as raw materials, powders of these raw materials were formulated to give a composition of, in % by mole, 25.3% $Na_2O$, 31.6% $ZrO_2$, 1.0% $Y_2O_3$, 8.4% $P_2O_5$, and 33.7% $SiO_2$, and the mixture was ground and mixed in ethanol for 10 hours with a ball mill using a 5-mm diameter $Al_2O_3$ ball. The obtained powder was formed into a 0.2-mm thick sheet, then isostatically pressed at a pressure of 40 MPa, and heat-treated in an air atmosphere at 1250° C. for two hours to obtain a solid electrolyte sheet made of NASICON crystal.

Furthermore, solid electrolyte powder (having an average particle size of 12 μm) was separately prepared by grinding the obtained solid electrolyte sheet with a planetary ball mill and passing the ground product through a sieve with 10-μm openings. When the powder X-ray diffraction pattern of the solid electrolyte crystal was checked, diffraction lines originating from ($Na_{3.05}Zr_2Si_{2.05}P_{0.95}O_{12}$) which is a trigonal crystal belonging to space group R-3c were confirmed.

(3) Production of Solid-State Sodium-Ion Secondary Battery

The negative-electrode active material precursor powder and solid electrolyte powder obtained in the above manners, and acetylene black (SUPER C65 manufactured by TIMICAL) as electrically conductive carbon were weighed in each ratio described in Tables 15 and 16 and mixed at 300 rpm for 30 minutes using a planetary ball mill. Added to 100 parts by mass of the obtained mixture powder were 10 parts by mass of polypropylene carbonate (manufactured by Sumitomo Seika Chemicals Co., Ltd.) and additionally 30 parts by mass of N-methylpyrrolidinone. The mixture was fully stirred with a planetary centrifugal mixer to form a slurry.

The obtained slurry was applied, with an area of 1 $cm^2$ and a thickness of 80 μm, to one side of the solid electrolyte sheet described in Tables 15 and 16 and then dried at 70° C. for three hours. Next, the obtained product was put into a carbon container and fired in a nitrogen atmosphere at 650° C. (600° C. as for No. 92) for an hour to soften and fluidize the negative-electrode active material precursor powder and thermally fuse the materials together, thus forming a negative electrode layer. All the above operations were conducted in an environment at a temperature of the dew point minus 50° C. or below.

When the powder X-ray diffraction patterns of the materials making up the negative electrode layer were checked, an amorphous phase was confirmed as for Nos. 89 to 91 and 93. Furthermore, in the powder X-ray diffraction pattern of the materials making up the negative electrode layer of sample No. 92, an amorphous halo and crystalline diffraction lines were detected. The content of the amorphous phase was determined by the previously described method.

Regarding all the negative electrodes, respective crystalline diffraction lines originating from the solid electrolyte powders used were confirmed.

Next, a current collector formed of a 300-nm thick gold electrode was formed on the surface of the negative electrode layer using a sputtering device (SC-701AT manufactured by Sanyu Electron Co., Ltd.). Furthermore, in an argon atmosphere at the dew point minus 70° C. or below, a metallic sodium layer serving as a counter electrode was pressure-bonded to the surface of the solid electrolyte layer opposite to the surface thereof on which the negative electrode layer was formed. The obtained laminate was placed on a lower lid of a coin cell and covered with an upper lid to produce a CR2032-type test cell.

(4) Charge and Discharge Test

The produced test cell was CC (constant-current) charged at 60° C. from an open circuit voltage to 0.01 V and its first charge capacity was determined. Next, the test cell was CC discharged from 0.01 V to 2.5 V and its first discharge capacity was determined. In this test, the C rate was 0.01 C and "Discharge Capacity Retention" was evaluated as a rate of the 10th cycle discharge capacity to the first discharge capacity. The results are shown in Tables 15 and 16. Furthermore, the first charge/discharge curves of the test cells for solid-state sodium-ion secondary batteries using samples Nos. 92 and 93 are shown in FIGS. 11 and 12.

As is obvious from Tables 15 and 16 and FIGS. 11 and 12, each of samples Nos. 89 to 93 exhibited an excellent discharge voltage of 1.4 V or less and an excellent discharge capacity retention of 98% or more.

INDUSTRIAL APPLICABILITY

The negative-electrode active material for a power storage device according to the present invention is suitable for power storage devices used in portable electronic devices, electric vehicles, electric power tools, backup emergency power supplies, and so on.

The invention claimed is:

1. A negative-electrode active material for a power storage device, the negative-electrode active material containing, in terms of % by mole of oxide, 1 to 95% $TiO_2$ and 5 to 75% $P_2O_5+SiO_2+B_2O_3+Al_2O_3+R'O$ (where R' represents at least one selected from Mg, Ca, Sr, Ba, and Zn), 12.5% or less $Li_2O$, and containing 10% by mass or more amorphous phase.

2. The negative-electrode active material for a power storage device according to claim 1, further containing 1 to 70% $R_2O$ (where R represents at least one selected from Li, Na, and K).

3. The negative-electrode active material for a power storage device according to claim 1, wherein the negative-electrode active material is made of an amorphous phase.

4. The negative-electrode active material for a power storage device according to claim 1, wherein the negative-electrode active material is for use in a sodium-ion secondary battery.

5. A negative electrode material for a power storage device containing the negative-electrode active material for a power storage device according to claim 1.

6. The negative-electrode active material for a power storage device according to claim 1, further containing 1 to 70% $Na_2O$.

* * * * *